United States Patent
Román et al.

(10) Patent No.: US 7,526,029 B2
(45) Date of Patent: Apr. 28, 2009

(54) GENERAL PURPOSE COMPRESSION FOR VIDEO IMAGES (RHN)

(76) Inventors: Kendyl A. Román, 730 Bantry Ct., Sunnyvale, CA (US) 94087-3402; Cyrus J. Hoomani, 2 Townsend St., Apartment 1-503, San Francisco, CA (US) 94107; Richard S. Neale, 1260 Albion La., Sunnyvale, CA (US) 94087

( * ) Notice: Subject to any disclaimer, the term of this patent is extended or adjusted under 35 U.S.C. 154(b) by 328 days.

(21) Appl. No.: 11/280,656

(22) Filed: Nov. 15, 2005

(65) Prior Publication Data

US 2006/0067408 A1    Mar. 30, 2006

Related U.S. Application Data

(62) Division of application No. 09/470,566, filed on Dec. 22, 1999, now Pat. No. 7,016,417.

(60) Provisional application No. 60/113,276, filed on Dec. 23, 1998.

(51) Int. Cl.
*H04N 7/12* (2006.01)
*H04N 11/02* (2006.01)

(52) U.S. Cl. ............... 375/240.23; 375/240.01

(58) Field of Classification Search ........... 348/207, 348/143, 211, 212, 400, 407, 384, 413, 385, 348/415, 631, 642; 382/245, 232, 246, 250, 382/239, 242, 166, 162; 375/240.01, 240.23, 375/240.16, 240, 240.21; 345/636, 426
See application file for complete search history.

(56) References Cited

U.S. PATENT DOCUMENTS

| | | | | |
|---|---|---|---|---|
| 5,047,853 A | * | 9/1991 | Hoffert et al. | 375/240.01 |
| 6,339,616 B1 | * | 1/2002 | Kovalev | 375/240.16 |
| 6,384,862 B1 | * | 5/2002 | Brusewitz et al. | 348/212 |
| 7,016,417 B1 | * | 3/2006 | Roman et al. | 375/240.23 |
| 2007/0223574 A1 | * | 9/2007 | Roman et al. | 375/240.01 |

* cited by examiner

*Primary Examiner*—Behrooz Senfi
(74) *Attorney, Agent, or Firm*—Schwabe, Williamson & Wyatt, P.C.

(57) ABSTRACT

Methods, medium, and machines which compress, encode, enhance, transmit, decompress and display digital video images in real time. Real time compression is achieved by sub-sampling each frame of a video signal, matching the illumination intensity value representing each pixel with a line number, incrementing a repeat counter, and encoding a repeat data structure with the repeat counter and line number data structure with the line number forming a compressed stream of data. Real time transmission of video images is achieved due to high levels of effective compression. Real time decompression is achieve by decoding and decompressing the encoded data to display high quality images. High levels of effective compression also reduce the storage space requirement for recorded video.

25 Claims, 19 Drawing Sheets

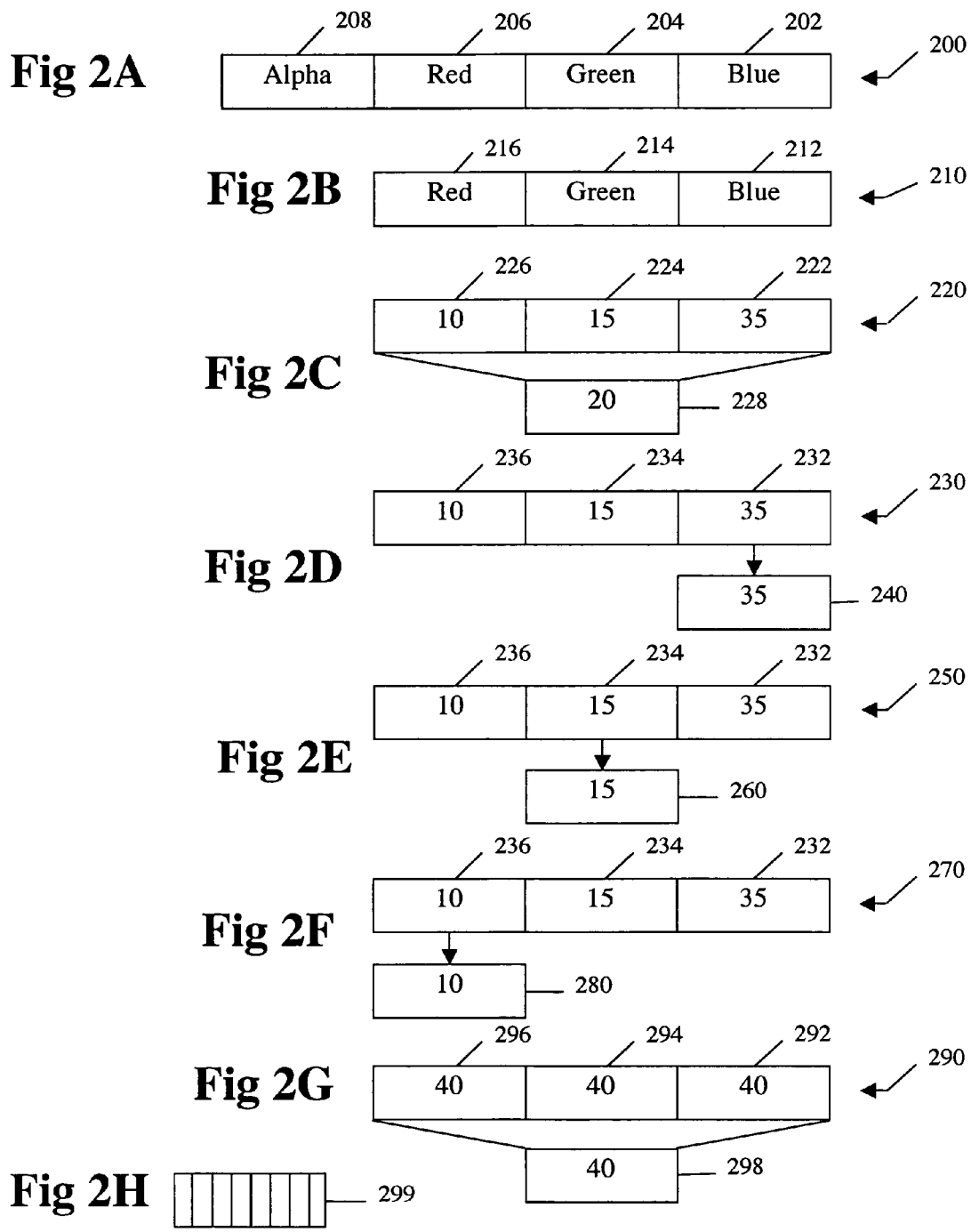

|  370 |  330 |     |     |     |     |     |     |     |     |  360 |
|-----|-----|-----|-----|-----|-----|-----|-----|-----|-----|-----|
| 0  | 0   | 1   | 2   | 3   | 4   |     |     |     |     | 0   |
| 1  | 5   | 6   | 7   | 8   | 9   | 10  | 11  | 12  |     | 8   |
| 2  | 13  | 14  | 15  | 16  | 17  | 18  | 19  | 20  |     | 16  |
| 3  | 21  | 22  | 23  | 24  | 25  | 26  | 27  | 28  | 29  | 24  |
| 4  | 30  | 31  | 32  | 33  | 34  | 35  | 36  | 37  |     | 33  |
| 5  | 38  | 39  | 40  | 41  | 42  | 43  | 44  | 45  |     | 41  |
| 6  | 46  | 47  | 48  | 49  | 50  | 51  | 52  | 53  |     | 49  |
| 7  | 54  | 55  | 56  | 57  | 58  | 59  | 60  | 61  | 62  | 57  |
| 8  | 63  | 64  | 65  | 66  | 67  | 68  | 69  | 70  |     | 66  |
| 9  | 71  | 72  | 73  | 74  | 75  | 76  | 77  | 78  |     | 74  |
| 10 | 79  | 80  | 81  | 82  | 83  | 84  | 85  | 86  |     | 82  |
| 11 | 87  | 88  | 89  | 90  | 91  | 92  | 93  | 94  | 95  | 90  |
| 12 | 96  | 97  | 98  | 99  | 100 | 101 | 102 | 103 |     | 99  |
| 13 | 104 | 105 | 106 | 107 | 108 | 109 | 110 | 111 |     | 107 |
| 14 | 112 | 113 | 114 | 115 | 116 | 117 | 118 | 119 |     | 115 |
| 15 | 120 | 121 | 122 | 123 | 124 | 125 | 126 | 127 | 128 | 123 |
| 16 | 129 | 130 | 131 | 132 | 133 | 134 | 135 | 136 |     | 132 |
| 17 | 137 | 138 | 139 | 140 | 141 | 142 | 143 | 144 |     | 140 |
| 18 | 145 | 146 | 147 | 148 | 149 | 150 | 151 | 152 |     | 148 |
| 19 | 153 | 154 | 155 | 156 | 157 | 158 | 159 | 160 | 161 | 156 |
| 20 | 162 | 163 | 164 | 165 | 166 | 167 | 168 | 169 |     | 165 |
| 21 | 170 | 171 | 172 | 173 | 174 | 175 | 176 | 177 |     | 173 |
| 22 | 178 | 179 | 180 | 181 | 182 | 183 | 184 | 185 |     | 181 |
| 23 | 186 | 187 | 188 | 189 | 190 | 191 | 192 | 193 | 194 | 189 |
| 24 | 195 | 196 | 197 | 198 | 199 | 200 | 201 | 202 |     | 198 |
| 25 | 203 | 204 | 205 | 206 | 207 | 208 | 209 | 210 |     | 206 |
| 26 | 211 | 212 | 213 | 214 | 215 | 216 | 217 | 218 |     | 214 |
| 27 | 219 | 220 | 221 | 222 | 223 | 224 | 225 | 226 | 227 | 222 |
| 28 | 228 | 229 | 230 | 231 | 232 | 233 | 234 | 235 |     | 231 |
| 29 | 236 | 237 | 238 | 239 | 240 | 241 | 242 | 243 |     | 239 |
| 30 | 244 | 245 | 246 | 247 | 248 | 249 | 250 | 251 |     | 247 |
| 31 | 252 | 253 | 254 | 255 |     |     |     |     |     | 255 |

(column 350 points to the middle of the 330 block)

Fig 3B

```
unsigned char encodeTable[ ] =          ← 1010
{
        24, 24, 24, 24, 24,                      //   0 -   4 ->   0
        18, 18, 18, 18, 18, 18, 18, 18,          //   5 -  12 ->   8
        25, 25, 25, 25, 25, 25, 25, 25,          //  13 -  20 ->  16
        5,  5,  5,  5,  5,  5,  5,  5,  5,       //  21 -  29 ->  24
        3,  3,  3,  3,  3,  3,  3,  3,           //  30 -  37 ->  33
        6,  6,  6,  6,  6,  6,  6,  6,           //  38 -  45 ->  41
        12, 12, 12, 12, 12, 12, 12, 12,          //  46 -  53 ->  49
        30, 30, 30, 30, 30, 30, 30, 30, 30,      //  54 -  62 ->  57
        21, 21, 21, 21, 21, 21, 21, 21,          //  63 -  70 ->  66
        27, 27, 27, 27, 27, 27, 27, 27,          //  71 -  78 ->  74
        1,  1,  1,  1,  1,  1,  1,  1,           //  79 -  86 ->  82
        16, 16, 16, 16, 16, 16, 16, 16, 16,      //  87 -  95 ->  90
        31, 31, 31, 31, 31, 31, 31, 31,          //  96 - 103 ->  99
        4,  4,  4,  4,  4,  4,  4,  4,           // 104 - 111 -> 107
        14, 14, 14, 14, 14, 14, 14, 14,          // 112 - 119 -> 115
        20, 20, 20, 20, 20, 20, 20, 20, 20,      // 120 - 128 -> 123
        10, 10, 10, 10, 10, 10, 10, 10,          // 129 - 136 -> 132
        28, 28, 28, 28, 28, 28, 28, 28,          // 137 - 144 -> 140
        23, 23, 23, 23, 23, 23, 23, 23,          // 145 - 152 -> 148
        9,  9,  9,  9,  9,  9,  9,  9,  9,       // 153 - 161 -> 156
        15, 15, 15, 15, 15, 15, 15, 15,          // 162 - 169 -> 165
        22, 22, 22, 22, 22, 22, 22, 22,          // 170 - 177 -> 173
        29, 29, 29, 29, 29, 29, 29, 29,          // 178 - 185 -> 181
        13, 13, 13, 13, 13, 13, 13, 13, 13,      // 186 - 194 -> 189
        19, 19, 19, 19, 19, 19, 19, 19,          // 195 - 202 -> 198
        26, 26, 26, 26, 26, 26, 26, 26,          // 203 - 210 -> 206
        2,  2,  2,  2,  2,  2,  2,  2,           // 211 - 218 -> 214
        17, 17, 17, 17, 17, 17, 17, 17, 17,      // 219 - 227 -> 222
        0,  0,  0,  0,  0,  0,  0,  0,           // 228 - 235 -> 231
        8,  8,  8,  8,  8,  8,  8,  8,           // 236 - 243 -> 239
        11, 11, 11, 11, 11, 11, 11, 11,          // 244 - 251 -> 247
        7,  7,  7,  7                            // 252 - 255 -> 255
};
```

Fig 10B

```
int decodeTable[ ] =                              ← 1020
{
        0xff << 24 | 231 << 16 | 231 << 8 | 231,
        0xff << 24 |  82 << 16 |  82 << 8 |  82,
        0xff << 24 | 214 << 16 | 214 << 8 | 214,
        0xff << 24 |  33 << 16 |  33 << 8 |  33,
        0xff << 24 | 107 << 16 | 107 << 8 | 107,
        0xff << 24 |  24 << 16 |  24 << 8 |  24,
        0xff << 24 |  41 << 16 |  41 << 8 |  41,
        0xff << 24 | 255 << 16 | 255 << 8 | 255,
        0xff << 24 | 239 << 16 | 239 << 8 | 239,
        0xff << 24 | 156 << 16 | 156 << 8 | 156,
        0xff << 24 | 132 << 16 | 132 << 8 | 132,
        0xff << 24 | 247 << 16 | 247 << 8 | 247,
        0xff << 24 |  49 << 16 |  49 << 8 |  49,
        0xff << 24 | 189 << 16 | 189 << 8 | 189,
        0xff << 24 | 115 << 16 | 115 << 8 | 115,
        0xff << 24 | 165 << 16 | 165 << 8 | 165,
        0xff << 24 |  90 << 16 |  90 << 8 |  90,
        0xff << 24 | 222 << 16 | 222 << 8 | 222,
        0xff << 24 |   8 << 16 |   8 << 8 |   8,
        0xff << 24 | 198 << 16 | 198 << 8 | 198,
        0xff << 24 | 123 << 16 | 123 << 8 | 123,
        0xff << 24 |  66 << 16 |  66 << 8 |  66,
        0xff << 24 | 173 << 16 | 173 << 8 | 173,
        0xff << 24 | 148 << 16 | 148 << 8 | 148,
        0xff << 24 |   0 << 16 |   0 << 8 |   0,
        0xff << 24 |  16 << 16 |  16 << 8 |  16,
        0xff << 24 | 206 << 16 | 206 << 8 | 206,
        0xff << 24 |  74 << 16 |  74 << 8 |  74,
        0xff << 24 | 140 << 16 | 140 << 8 | 140,
        0xff << 24 | 181 << 16 | 181 << 8 | 181,
        0xff << 24 |  57 << 16 |  57 << 8 |  57,
        0xff << 24 |  99 << 16 |  99 << 8 |  99
};
```

Fig 10C

GENERAL PURPOSE COMPRESSION FOR VIDEO IMAGES (RHN)

CROSS-REFERENCE TO RELATED APPLICATIONS

This application is a divisional application based on prior application Ser. No. 09/470,566, entitled General Purpose Compression for Video Images (RHN), filed on Dec. 22, 1999, now U.S. Pat. No. 7,016,417. This application claims priority under 35 U.S.C. § 119(e) of the co-pending U.S. provisional application Ser. No. 60/113,276 filed on 1998 Dec. 23, and entitled "METHOD OF IMAGE ENHANCEMENT, COMPRESSION, AND ENCODING of GRAYSCALE IMAGES (ECHOCODEC)." The provisional application Ser. No. 60/113,276 filed on 1998 Dec. 23 and entitled "METHOD OF IMAGE ENHANCEMENT, COMPRESSION, AND ENCODING of GRAYSCALE IMAGES (ECHOCODEC)" is also hereby incorporated by reference. This application also claims priority under 35 U.S.C. § 119(e) of our co-pending U.S. patent application Ser. No. 09/312,922 filed on 1999 May 17, and entitled "SYSTEM FOR TRANSMITTING VIDEO IMAGES OVER A COMPUTER NETWORK TO A REMOTE RECEIVER" which describes an embodiment of the invention of this application in combination with our co-pending U.S. provisional application Ser. No. 60/085,818 filed on 1998 May 18, and entitled "APPARATUS FOR TRANSMITTING LIVE VIDEO IMAGES OVER A COMPUTER NETWORK TO MULTIPLE REMOTE RECEIVERS." U.S. patent application Ser. No. 09/312,922 filed on 1999 May 17, and entitled "SYSTEM FOR TRANSMITTING VIDEO IMAGES OVER A COMPUTER NETWORK TO A REMOTE RECEIVER" is also hereby incorporated by reference.

BACKGROUND

1. Field of the Invention

This invention relates to data compression, specifically to the compression and decompression of video images.

2. Description of Prior Art

In the last few years, there have been tremendous advances in the speed of computer processors and in the availability of bandwidth of worldwide computer networks such as the Internet. These advances have led to a point where businesses and households now commonly have both the computing power and network connectivity necessary to have point-to-point digital communications of audio, rich graphical images, and video. However the transmission of video signals with the full resolution and quality of television is still out of reach. In order to achieve an acceptable level of video quality, the video signal must be compressed significantly without losing either spatial or temporal quality.

A number of different approaches have been taken but each has resulted in less than acceptable results. These approaches and their disadvantages are disclosed by Mark Nelson in a book entitled *The Data Compression Book, Second Edition*, published by M&T Book in 1996. Mark Morrison also discusses the state of the art in a book entitled *The Magic of Image Processing*, published by Sams Publishing in 1993.

Video Signals

Standard video signals are analog in nature. In the United States, television signals contain 525 scan lines of which 480 lines are visible on most televisions. The video signal represents a continuous stream of still images, also known as frames, that are fully scanned, transmitted and displayed at a rate of 30 frames per second. This frame rate is considered full motion. A television screen has a 4:3 aspect ratio.

When an analog video signal is digitized, each of the 480 lines is sampled 640 times and each sample is represented by a number. Each sample point is called a picture element, or pixel. A two dimensional array is created that is 640 pixels wide and 480 pixels high. This 640×480 pixel array is a still graphical image that is considered to be full frame. The human eye can perceive 16.7 thousand colors. A pixel value comprised of 24 bits can represent each perceivable color. A graphical image made up of 24 bit pixels is considered to be full color. A single second-long full frame, full color video requires over 220 millions bits of data.

The transmission of 640×480 pixels×24 bits per pixel times 30 frames requires the transmission of 221,184,000 millions bits per second. A T1 Internet connection can transfer up to 1.54 millions bits per second. A high speed (56 Kb) modem can transfer data at a maximum rate of 56 thousand bits per second. The transfer of full motion, full frame, full color digital video over a T1 Internet connection, or 56 Kb modem, will require an effective data compression of over 144:1, or 3949:1, respectively.

Basic Run-Length Encoding

An early technique for data compression is run-length encoding where a repeated series of items are replaced with one sample item and a count for the number of times the sample repeats. Prior art shows run-length encoding of both individual bits and bytes. These simple approaches by themselves have failed to achieve the necessary compression ratios.

Variable Length Encoding

In the late 1940s, Claude Shannon at Bell Labs and R. M. Fano at MIT pioneered the field of data compression. Their work resulted in a technique of using variable length codes where codes with low probabilities have more bits, and codes with higher probabilities have fewer bits. This approach requires multiple passes through the data to determine code probability and then to encode the data. This approach also has failed to achieve the necessary compression ratios.

D. A. Huffman disclosed a more efficient approach of variable length encoding known as Huffman coding in a paper entitled "A Method for Construction of Minimum Redundancy Codes," published in 1952. This approach also has failed to achieve the necessary compression ratios.

Arithmetic, Finite Context, and Adaptive Coding

In the 1980s, arithmetic, finite coding, and adaptive coding have provided a slight improvement over the earlier methods. These approaches require extensive computer processing and have failed to achieve the necessary compression ratios.

Dictionary-Based Compression

Dictionary-based compression uses a completely different method to compress data. Variable length strings of symbols are encoded as single tokens. The tokens form an index to a dictionary. In 1977, Abraham Lempel and Jacob Ziv published a paper entitled, "A Universal Algorithm for Sequential Data Compression" in IEEE Transactions on Information Theory, which disclosed a compression technique commonly known as LZ77. The same authors published a 1978 sequel entitled, "Compression of Individual Sequences via Variable-Rate Coding," which disclosed a compression technique commonly known as LZ78 (see U.S. Pat. No. 4,464,650). Terry Welch published an article entitled, "A Technique for High-Performance Data Compression," in the June 1984 issue of IEEE Computer, which disclosed an algorithm commonly known as LZW, which is the basis for the GIF algorithm (see U.S. Pat. Nos. 4,558,302, 4,814,746, and 4,876, 541). In 1989, Stack Electronics implemented a LZ77 based method called QIC-122 (see U.S. Pat. Nos. 5,532,694, 5,506, 580, and 5,463,390). The output of a QIC-122 encoder consists of a stream of data, which, in turn consists of tokens and symbols freely intermixed. Each token or symbol is prefixed by a single bit flag that indicates whether the following is a dictionary reference or a plain symbol. The definitions for these two sequences are:

(a) plaintext: <1><eight-bit-symbol>
(b) dictionary reference: <0><window-offset><phrase-length>

Windows offsets are encoded as seven bits or eleven bits. These lossless (method where no data is lost) compression methods can achieve up to 10:1 compression ratios on graphic images typical of a video image. While these dictionary-based algorithms are popular, these approaches require extensive computer processing and have failed to achieve the necessary compression ratios.

JPEG and MPEG

Graphical images have an advantage over conventional computer data files: they can be slightly modified during the compression/decompression cycle without affecting the perceived quality on the part of the viewer. By allowing some loss of data, compression ratios of 25:1 have been achieved without major degradation of the perceived image. The Joint Photographic Experts Group (JPEG) has developed a standard for graphical image compression. The JPEG lossy (method where some data is lost) compression algorithm first divides the color image into three color planes and divides each plane into 8 by 8 blocks, and then the algorithm operates in three successive stages:

(a) A mathematical transformation known as Discrete Cosine Transform (DCT) takes a set of points from the spatial domain and transforms them into an identical representation in the frequency domain.
(b) A lossy quantization is performed using a quantization matrix to reduce the precision of the coefficients.
(c) The zero values are encoded in a zig-zag sequence (see Nelson, pp. 341-342).

JPEG can be scaled to achieve a higher compression ratio by allowing more loss in the quantization stage of the compression. However this loss results in certain blocks of the image being compressed such that areas of the image have a blocky appearance and the edges of the 8 by 8 blocks become apparent because they no longer match the colors of their adjacent blocks. Another disadvantage of JPEG is smearing. The true edges in an image get blurred due to the lossy compression method.

The Moving Pictures Expert Group (MPEG) uses a combination of JPEG based techniques combined with forward and reverse temporal differencing. MPEG compares adjacent frames and for those blocks that are identical to those in a previous or subsequent frame and only a description of the previous or subsequent identical block is encoded. MPEG suffers from the same blocking and smearing problems as JPEG.

These approaches require extensive computer processing and have failed to achieve the necessary compression ratios without unacceptable loss of image quality and artificially induced distortion.

QuickTime: CinePak, Sorensen, H.263

Apple Computer, Inc. released a component architecture for digital video compression and decompression, named QuickTime. Any number of methods can be encoded into a QuickTime compressor/decompressor (codec). Some popular codec are CinePak, Sorensen, and H.263. CinePak and Sorensen both require extensive computer processing to prepare a digital video sequence for playback in real time; neither can be used for live compression. H.263 compresses in real time but does so by sacrificing image quality resulting in severe blocking and smearing.

Fractal and Wavelet Compression

Extremely high compression ratios are achievable with fractal and wavelet compression algorithms. These approaches require extensive computer processing and generally cannot be completed in real time.

SUMMARY OF THE INVENTION

In accordance with the present invention a method of compression of a video stream comprises steps of sub-sampling a video frame, determining a code for each pixel, run-length encoding the codes whereby the method can be executed in real time and the compressed representation of codes saves substantial space on a storage medium and require substantially less time and bandwidth to be transported over a communications link. The present invention includes a corresponding method for decompressing the encoded data.

Objects and Advantages

Accordingly, beside the objects and advantages of the method described in our patent above, some additional objects and advantages of the present invention are:

(a) to provide a method of compressing and decompressing video signals so that the video information can be transported across a digital communications channel in real time.
(b) to provide a method of compressing and decompressing video signals such that compression can be accomplished with software on commercially available computers without the need for additional hardware for either compression or decompression.
(c) to provide a high quality video image without the blocking and smearing defects associated with prior art lossy methods.
(d) to provide a high quality video image that is suitable for use in medical applications.
(e) to provide some level of encryption so that images are not directly viewable from the data as contained in the transmission.
(f) to provide a method of compression of video signals such that the compressed representation of the video signals is substantially reduced in size for storage on a storage medium.
(g) to enhance electronically generated images by filtering highs and lows.

DRAWING FIGURES

In the drawings, closely related figures have the same number but different alphabetic suffixes.

FIG. 2A to 2H show alternatives for selecting a pixel value for encoding.

FIG. 3B shows a chart of values corresponding to the sample encode table.

FIGS. 10A to 10C show an encryption key, an encryption table and a decryption table.

Figure 1:
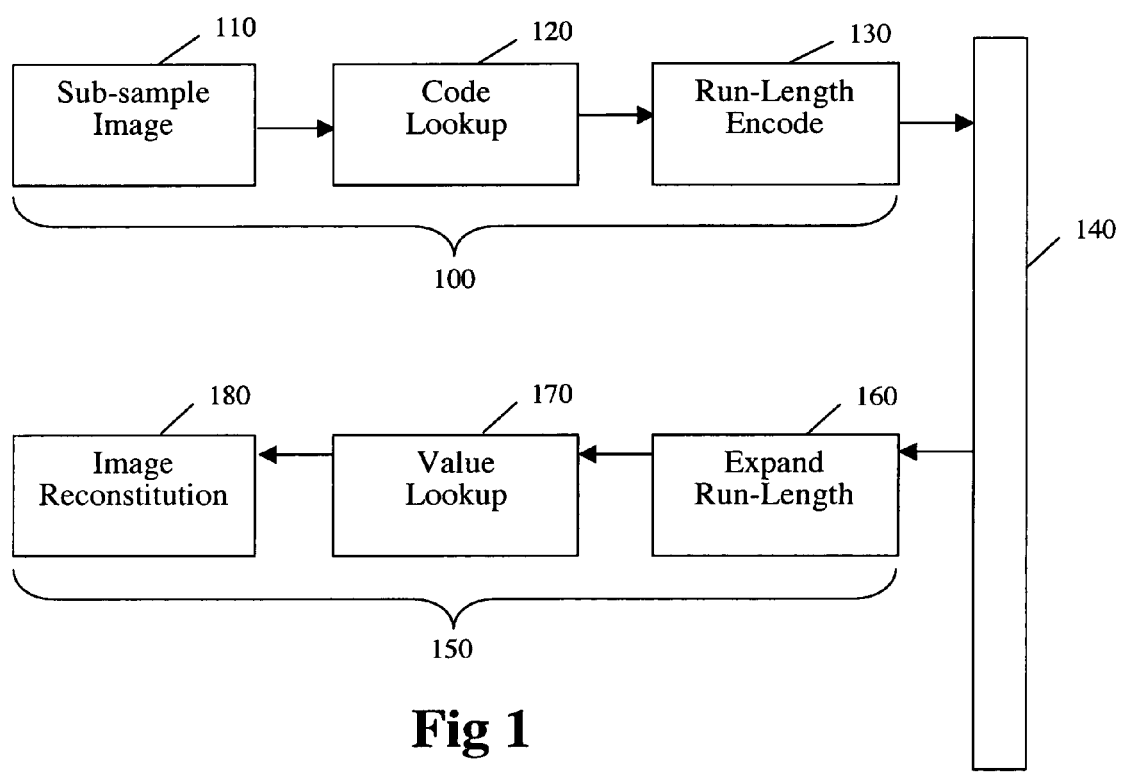
FIG. 1 shows the high level steps of compression and decompression of an image.

| Reference Numerals in Drawings | |
|---|---|
| 100 | compression steps |
| 110 | sub-sampling step |
| 120 | code lookup step |
| 130 | run-length encoding step |
| 140 | encoded data |
| 150 | decompression steps |
| 160 | run-length expansion step |
| 170 | value lookup step |
| 180 | image reconstitution step |
| 200 | 32 bit pixel value |
| 202 | blue channel |
| 204 | green channel |
| 206 | red channel |
| 208 | alpha channel |
| 210 | 24 bit pixel value |
| 212 | blue component |
| 214 | green component |
| 216 | red component |
| 220 | RGB averaging diagram |
| 222 | blue value |
| 224 | green value |
| 226 | red value |
| 228 | averaged value |
| 230 | blue selection diagram |
| 232 | blue instance |
| 234 | green instance |
| 236 | red instance |
| 240 | selected blue value |
| 250 | green selection diagram |
| 260 | selected green value |
| 270 | red selection diagram |
| 280 | selected red value |
| 290 | grayscale pixel |
| 292 | grayscale blue |
| 294 | grayscale green |
| 296 | grayscale red |
| 298 | selected grayscale value |
| 299 | 8 bit pixel value |
| 300 | encode table |
| 310 | codes |
| 320 | line comments |
| 330 | minimum values |
| 340 | maximum values |
| 350 | chart of values |

| -continued | |
|---|---|
| Reference Numerals in Drawings | |
| 360 | stepped values |
| 370 | line numbers |
| 400 | encode flowchart |
| 402 | encode entry |
| 403 | encode initialization step |
| 404 | get pixel step |
| 405 | get value step |
| 406 | lookup encoded value step |
| 408 | compare previous |
| 410 | increment counter step |
| 412 | check count overflow |
| 414 | new code step |
| 416 | check end of data |
| 418 | set done |
| 420 | counter overflow step |
| 422 | check done |
| 428 | encode exit |
| 430 | image |
| 440 | image width |
| 450 | image height |
| 460 | pixel stream |
| 500 | code byte |
| 510 | flag bit |
| 520 | repeat code |
| 530 | count |
| 550 | data code |
| 565 | data bit 6 |
| 570 | data bit 5 |
| 575 | data bit 4 |
| 580 | data bit 3 |
| 585 | data bit 2 |
| 590 | data bit 1 |
| 595 | data bit 0 |
| 610 | decimal values |
| 620 | first value |
| 622 | second value |
| 624 | third value |
| 626 | fourth value |
| 628 | fifth value |
| 630 | sixth value |
| 632 | seventh value |
| 640 | binary code |
| 650 | first byte |
| 651 | repeat count |
| 652 | second byte |
| 653 | first code |
| 654 | third byte |
| 655 | second code |
| 656 | fourth byte |
| 657 | third code |
| 700 | decode table |
| 710 | alpha values |
| 720 | red values |
| 730 | green values |
| 740 | blue values |
| 800 | 8 bit pixel |
| 810 | pixel bit 7 |
| 812 | pixel bit 6 |
| 814 | pixel bit 5 |
| 816 | pixel bit 4 |
| 818 | pixel bit 3 |
| 820 | pixel bit 2 |
| 822 | pixel bit 1 |
| 824 | pixel bit 0 |
| 830 | 5 bit sample |
| 832 | sample bit 4 |
| 834 | sample bit 3 |
| 836 | sample bit 2 |
| 838 | sample bit 1 |
| 840 | sample bit 0 |
| 850 | ignored bits |
| 860 | decompressed pixel |
| 880 | 3 low order bits |
| 900 | decode entry |
| 901 | decode initialize step |
| 902 | get code step |
| 906 | determine type |

-continued

Reference Numerals in Drawings

| | |
|---|---|
| 908 | decode lookup step |
| 909 | check zero count |
| 910 | place pixel step |
| 912 | assign counter step |
| 914 | reset counter step |
| 916 | check length |
| 918 | decode exit |
| 920 | decode flowchart |
| 1000 | encryption key |
| 1010 | encryption table |
| 1020 | decryption table |

Terminology Correlation

Different terminology was used in the specification of application Ser. No. 09/312,922, portions of which are now included in this specification. The two specifications were written by two different authors who described distinct embodiments of the subject invention with two distinct sets of terminology. The following table provides a partial correlation between the two sets of terminology. Note that this correlation of terms does not necessarily mean the terms are equivalent. This high level correlation is provided to aid in understanding similarities and differences between the two specifications. Also note that the same term used in this specification in the field of "compression and decompression of video images" is likely to have different meaning in the Ser. No. 09/312,922 specification which was written in the field of "video communications systems" and "medical devices". For example in the field of compression the term "image" generally refers to a still image or a single frame of a video, but in the medical device field the term "image" often refers to the collection of all the frames in a video. Thus the terms themselves should be understood based on the respective original specification. The legal presumption that terms in related applications by the same inventors have the same meaning does not apply in this case.

| Terms Used In This Application | | Terms Used in application Ser. No. 09/312,922 |
|---|---|---|
| 140 | encoded data | stream of compressed data |
| 212 | blue component | blue scale value |
| 214 | green component | green scale value |
| 216 | red component | red scale value |
| 300 | encode table, encodeTable decodeTable | encodePallet decodePallet |
| 310 | codes code | compression lookup table 310 line number |
| 320 | line comments | documentation 320 |
| 350 | chart of values | lookup table 350 |
| 370 | line numbers | line number (column) |
| 430 | image | video image 400 |
| 460 | pixel stream | stream of pixel data 405 |
| 500 | code byte | data structure 500 |
| 510 | flag bit | identification bit 510 |
| 520 | repeat code | repeat data structure 525 |
| 530 | count | repeat value |
| 530 | count | repeat counter value |
| 530 | count | remaining bits 510 |
| 550 | data code | line number data structure 550 |
| 610 | decimal values | uncompressed data stream 1000 |
| 640 | binary code | compressed data stream 1020 |
| 700 | decode table | decompression lookup table 700 |
| 720 | red values | red scale illumination intensity value 710 |
| 730 | green values | green scale illumination intensity value 720 |

-continued

| Terms Used In This Application | | Terms Used in application Ser. No. 09/312,922 |
|---|---|---|
| 740 | blue values machine | blue scale illumination intensity value 730 system |

DESCRIPTION OF THE INVENTION

FIG. 1—Compression and Decompression Steps

FIG. 1 illustrates a sequence of compression steps 100 and a sequence of decompression steps 150 of the present invention. The compression steps 100 comprise a sub-sampling step 110, a code lookup step 120 and a run-length encoding step 130. After completion of the compression steps 100, a stream of encoded data 140 is output to either a storage medium or a transmission channel. The decompression steps 150 comprise a run-length expansion step 160 wherein the stream of encoded data 140 is processed, a value lookup step 170 and an image reconstitution step 180.

FIGS. 2A to 2H Selecting Pixel Values for Encoding

FIGS. 2A to 2G illustrate alternatives for selecting a pixel value for encoding. The sub-sampling step 110 (FIG. 1) includes sub-sampling of an 8 bit pixel value to obtain a value for use in the subsequent code lookup step 120 (FIG. 1).

Video digitizing hardware typically has the options of storing the pixel values as a 32 bit pixel value 200 or a 24 bit pixel value 210, shown in FIG. 2A and FIG. 2B, respectively. The 32 bit pixel value 200 is composed of a blue channel 202, a green channel 204, a red channel 206, and an alpha channel 208. Each channel contains 8 bits and can represent 256 saturation levels for the particular color channel. For each channel the saturation intensity value of zero represents the fully off state, and the saturation intensity value of "255" represents the fully on state. The 24 bit pixel value 210 is composed of a blue component 212, a green component 214, and a red component 216. There is no component for the alpha channel in the 24 bit pixel value 210. Regardless of the structure, the blue channel 202 is equivalent to the blue component 212, the green channel 204 is equivalent to the green component 214, and the red channel 206 is equivalent to the red component 216.

In the present invention, the 32 bit pixel value 200 alternative is preferred due to the consistent alignment of 32 bit values in most computer memories; however for simplicity of illustration the alpha channel 208 will be omitted in FIG. 2C to 2G.

If the video signal is digitized in color, the three color components may have different values. For example in FIG. 2C, a RGB averaging diagram 220 illustrates a blue value 222 of 35 decimal, a green value 224 of 15, and a red value 226 of 10. One alternative is to sub sample from 24 bits to 8 bits by averaging the three color values to obtain an averaged value 228 that, in this example, has the value of 20. (10+15+35)/3=20

FIG. 2D illustrates another alternative for selecting an 8 bit value in a blue selection diagram 230. In this example, a blue instance 232 has the value of 35, a green instance 234 has the value of 15, and a red instance 236 has the value of 10. In this alternative the blue instance 232 is always selected as a selected blue value 240.

FIG. 2E illustrates another alternative for selecting an 8 bit value in a green selection diagram 250. In this alternative the green instance 234 is always selected as a selected green value 260.

FIG. 2F illustrates another alternative for selecting an 8 bit value in a red selection diagram 270. In this alternative the red instance 236 is always selected as a selected red value 280.

If the video signal being digitized is grayscale, the three color components will have the same values. For example, in FIG. 2G, a grayscale pixel 290 comprises a grayscale blue 292 with a value of decimal 40, a grayscale green 294 with a value of 40, and a grayscale red with a value of 40. Because the values are all the same, it makes no difference which grayscale color component is selected, a selected grayscale value 298 will have the value of 40 in this example.

The preferred embodiment of this invention uses the low order byte of the pixel value, which is typically the blue component as shown in FIG. 2D.

FIG. 2H illustrates an 8 bit pixel value 299 which is selected by one of the alternatives described above. The 8 bit pixel value 299 is equivalent to items referenced by numerals 228, 240, 260, 280, or 298. This reduction of the 32 bit pixel value 200 or the 24 bit pixel value 210 contributes a reduction in data size of 4:1 or 3:1, respectively. This reduction recognizes that for some images, such as medical images or grayscale images, no relevant information is lost.

Figure 3A:
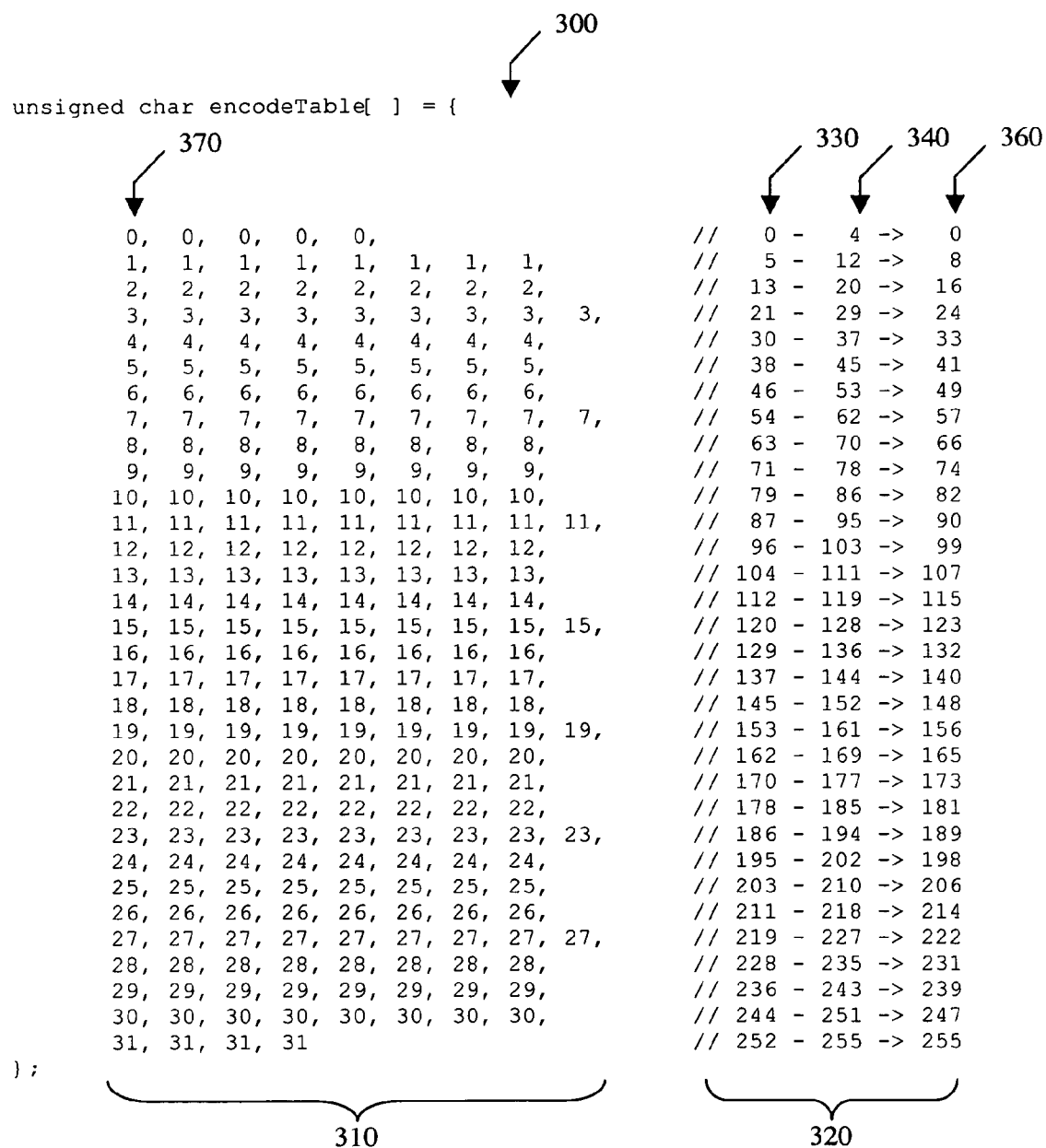
FIG. 3A shows the encode table of the preferred embodiment.

FIG. 3A—Encode Table

FIG. 3A illustrates an encode table 300 of the preferred embodiment of the present invention. The encode table 300 may be implemented in the C programming language, as shown, and is an array of 256 bytes. These bytes are the codes 310. Each line of the array elements is documented with one of a series of line comments 320. The line comments 320 contain a column of minimum values 330, a column of maximum values 340, and a column of stepped values 360. The first column of encode table 300 is a column of line numbers 370. The encode table is arranged such that each line contains codes 310 that have a value equal to its line number.

The encode table 300 reduces the 8 bit value 299 to a 5 bit code. This reduction recognizes that for some images, such as medical images, no relevant information was lost. This reduction also eliminates noise from the video signal and thereby increases the efficiency of the run-length encoding step 130 (FIG. 1).

Figure 11:
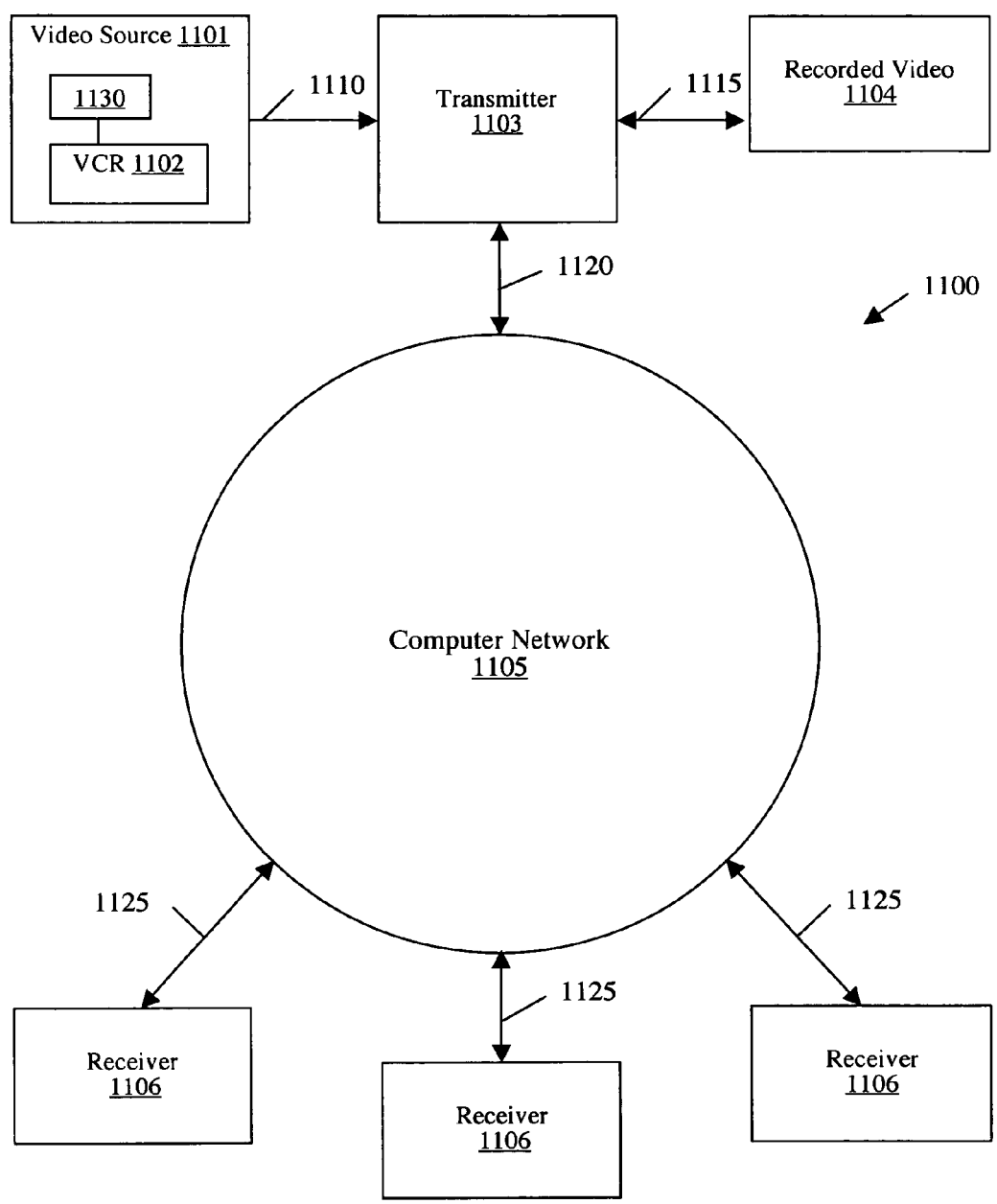
FIG. 11 illustrates a block diagram of a network for video transmission.

Using alternate terminology, FIG. 3A illustrates software code which is preferably utilized to perform compression of a stream of video data within the compressor (not shown) within the transmitter (FIG. 11). This software code includes a lookup table 310 with storage locations representing illumination intensity values from 0 to 255. Each representative storage location includes a line number from 0 to 31, which is indexed to a decompression lookup table. The compression lookup table 310 allows an eight-bit entry representing values from 0 to 255 to be compressed into a five-bit value. When provided with an illumination intensity value, the line number stored in the corresponding location within the compression lookup table 310 is read and provided as the compressed five bit illumination intensity value.

Documentation 320 is utilized to more clearly illustrate the function of each line contained within the compression lookup table 310. If the illumination intensity value is two (on a scale of 0 to 255), the line number zero stored at the storage location corresponding to this illumination intensity value is read from the compression lookup table 310. As can be seen from the compression lookup table 310, any illumination intensity value between zero to four has a corresponding five-bit line number of zero (on a scale of 0 to 31). In a further example, if the illumination intensity value is eighty, the line number ten stored at the storage location corresponding to this illumination intensity value is read from the compression lookup table 310. Instead of transmitting an eight-bit value of 0 to 255, which corresponds to an illumination intensity value of a pixel, the compression lookup table 310 is utilized to compress the eight-bit illumination intensity value into a corresponding five-bit line number value between 0 and 31.

This compression process is preferably optimized to compress data representing a stream of video images which originates from the video source 1101 (FIG. 11) and is received by the transmitter 1201 (FIG. 11). In practice, this data representing the stream of video images is transmitted in terms of a stream of pixel data. A predetermined number of pixels represent each video image. For each pixel, the illumination intensity value of zero represents a fully off state, and the illumination intensity value of "255" represents a fully on state.

FIG. 3B—Chart of Values FIG. 3B, a chart of values 350, enumerates the range that the 8 bit pixel value 299 can have and the respective placement of each value in the encode table 300. The first column of the chart enumerates the line numbers 370. Column A contains the minimum values 330 for each line. Each row of the chart has from four to nine sequential entries. The last column of the chart, column J, contains the stepped values (360) that are used in the value lookup step 170 (FIG. 1).

Using alternate terminology, FIG. 3B illustrates a lookup table 350. This lookup table 350 shows a logical representation of the compression process according to the compression lookup table 310 shown in FIG. 3A, for illustrative purposes only. The lookup table 350 classifies an eight-bit illumination intensity value for a pixel into an appropriate level within a reduced level index representing the five-bit line number. There are preferably 32 levels within this reduced level index, from 0 to 31, which are represented by the rows 0 to 31 on the left of the table 350. Each line number corresponds with one of the levels within the reduced level index. The lookup table 350 also includes 10 columns, which are represented by 330 and 360. The entries within columns 330 represent the illumination intensity value for the pixel and correspond to the storage locations within the lookup table 350. Each of the illumination intensity values is compressed into the line number of the row on which the illumination intensity value is found within the table 350.

The entries within column 360 are an average illumination intensity level associated with each line number, which will be discussed below in relation to the decompression lookup table. This average illumination intensity level falls within a range of a lowest and highest illumination intensity value within the particular row.

As a further example of the pixel data compression technique of the present invention utilizing the lookup table 350 when provided with pixel data having an illumination intensity value of 167, the line number 20 is provided as the compressed value from the compression lookup table. Any pixel having an illumination intensity value between 162 and 169 corresponds to the line number 20 in the lookup table 350.

Accordingly, for pixels having illumination intensity values between and including 162 and 169, the five bit line number 20 is provided as the compressed value, which is either stored by the recorded video device 1104 (FIG. 11) or transmitted by the transmitter 1103 to one or more of the receivers 1106.

Figure 4A:
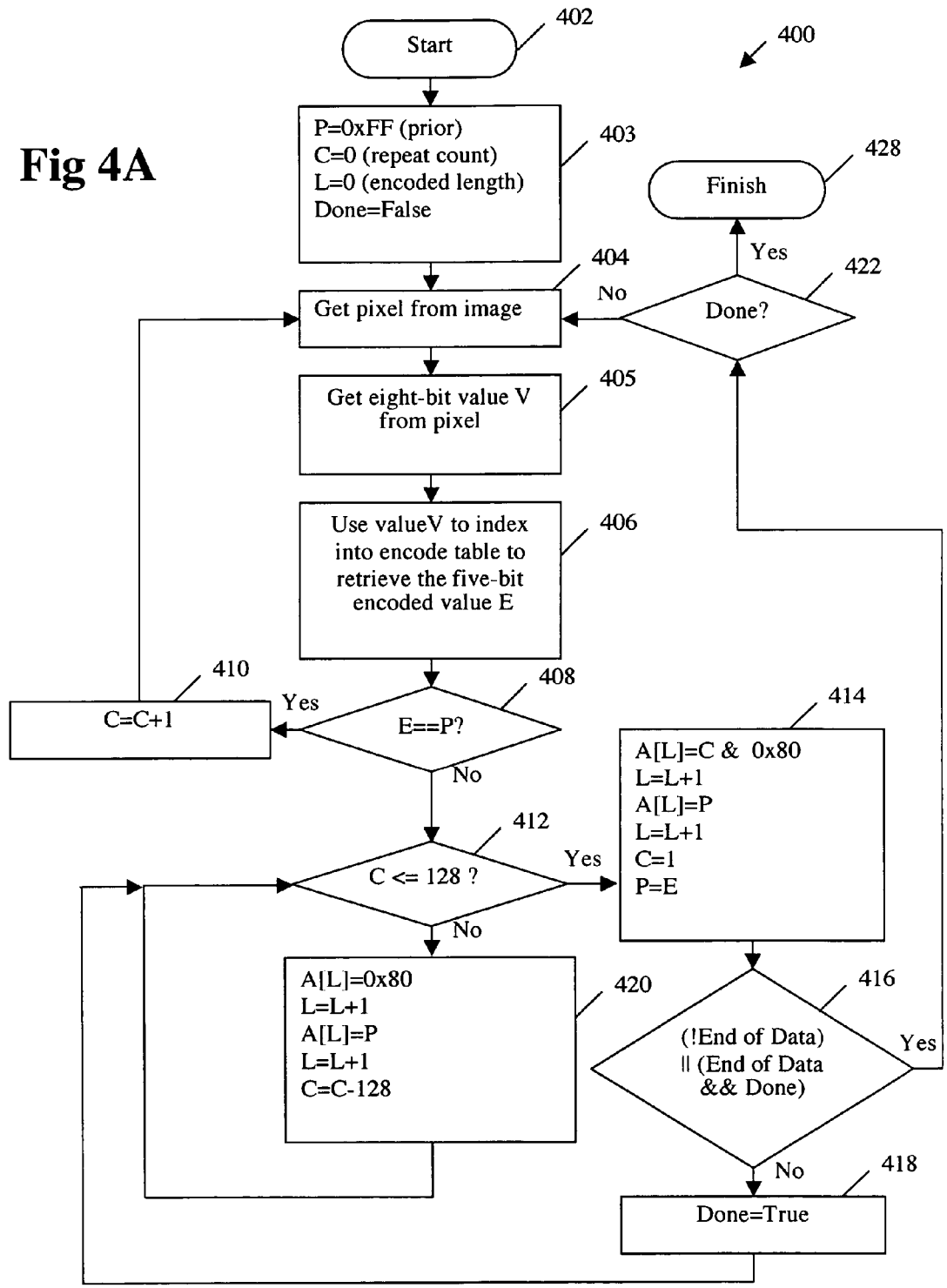
FIG. 4A shows the flowchart for the preferred embodiment of the compression method.

FIG. 4A—Encode Flowchart

FIG. 4A illustrates the encode flowchart 400 which represents the details of the preferred embodiment of the code lookup step 120 (FIG. 1) and the run-length encoding step 130 (FIG. 1) for the present invention.

The encoding begins at an encode entry 402. In a encode initialization step 403, a prior value P is set to a known value, preferably decimal "255" or hexadecimal 0xFF, a repeat count C is set to zero, an encoded length L is set to 0, and a completion flag "Done" is set to a logical value of false. Next, a get pixel step 404 obtains a pixel from the image being encoded. At a get value step 405, a value V is set to the 8 bit pixel 299 as derived from the pixel using one of the methods shown in FIG. 2C to 2G, preferably the fastest as explained above. At a lookup encoded value step 406, an encoded value E is set to the value of one of the codes 310 (FIG. 3) of the encode table 300 as indexed by V. Next, a compare previous 408 decision is made by comparing the values of E and P. If the values are the same, an increment counter step 410 is executed and flow continues to the get pixel step 404 that obtains the next pixel from the image.

If the encode value E does not match the prior value P, then a check count overflow 412 decision is made. If the counter C is less than or equal to 128, then a new code step 414 is executed, otherwise a counter overflow step 420 is executed.

At step 414, the counter C is bit-wise AND-ed with hexadecimal 0x80 which sets the high order bit to a binary value of 1 and is placed in the encoded data 140 buffer A at the next available location as indexed by the encoded length L. Then, continuing inside flowchart step 414, L is incremented, the prior value P is placed in the encoded data 140 buffer A, L is incremented, the repeat count C is set to 1 and the prior value P is set to the encode value E. After step 414, a check end of data decision is made by checking to see if there are any more pixels in the image or otherwise to see if the last value has been processed. Because this method utilizes a read ahead technique, step 414 must be executed one more time after the end of data is reached to process the last run-length. If there is more data in the image, flow continues to a check of the completion flag "Done" at step 422. If the check indicates that the process is not completed, flow continues to step 404.

If the end of data is reached but the completion flag "Done" is still false, flow continues to a set done step 418. At step 418, the completion flag "Done" is set to logical true, and flow continues to decision 412 where the last run-length will be output and flow will eventually exit through step 414, decision 416, decision 422, and then terminate at encode exit 428.

It is possible for the repeat count C to become larger than 128 requiring more bits than allocated by this method. This situation is handled by making the check count overflow 412 decision and executing the counter overflow step 420. At step 420, the value hexadecimal 0x80 is placed in the encoded data 140 buffer A at the next available location as indexed by the encoded length L. Then, continuing inside flowchart step 420, L is incremented, the prior value P is placed in the encoded data 140 buffer A, L is incremented, the repeat count C is decrement by 128. After step 420, flow continues to the check count overflow 412 decision. Thus when the encode value E repeats more that 128 times, multiple sets of repeat counts and encoded values are output to the encoded data 140 buffer.

This entire process is repeated for each image or video frame and the encoded length L is transmitted with the encoded data associated with each frame. The encoded length varies from frame to frame depending on the content of the image being encoded.

FIG. 4—Image and Pixel Stream

Figure 4B:
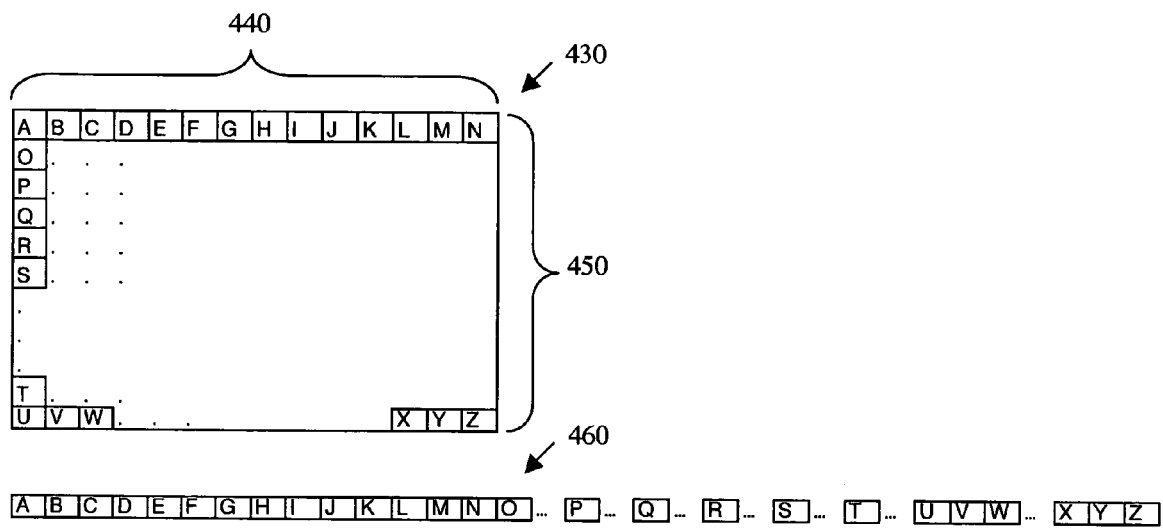
FIG. 4B shows an image and a corresponding stream of pixels.

FIG. 4B illustrates an image and its corresponding stream of pixels. A rectangular image 430 is composed of rows and columns of pixels. The image 430 has a width 440 and a height 450, both measured in pixels. Pixels in a row are accessed from left to right. Rows are accessed from top to bottom. Some pixels in the image are labeled from A to Z. Pixel A is the first pixel and pixel Z is the last pixel. Scanning left to right and top to bottom will produce a pixel stream 460. In the pixel stream 460, pixels A and B are adjacent. Also pixels N and O are adjacent even though they appear on different rows in the image. If adjacent pixels have the same code the process in FIG. 4A will consider them in the same run.

Because the video signal being digitized is analog there will be some loss of information in the analog to digital conversion. The video digitizing hardware can be configured to sample the analog data into the image 430 with almost any width 440 and any height 450. The present invention achieves most of its effective compression by sub-sampling the data image with the width 440 value less than the conventional 640 and the height 450 value less than the convention 480. The preferred embodiment of the invention for use in a medical application with T1 Internet transmission bandwidth is to sample at 320 by 240. However, a sampling resolution of 80 by 60 may be suitable for some video application.

Using alternate terminology, FIG. 4B illustrates a representative video image 430 and a corresponding stream of pixel data 460 representing the video image 430. The pixel data is transmitted in an order representing pixels from left to right on each horizontal line, successively, from top to bottom of the video image. As an example, pixels "C" and "D" are considered consecutive pixels within the stream of pixels 460.

Figure 5A:
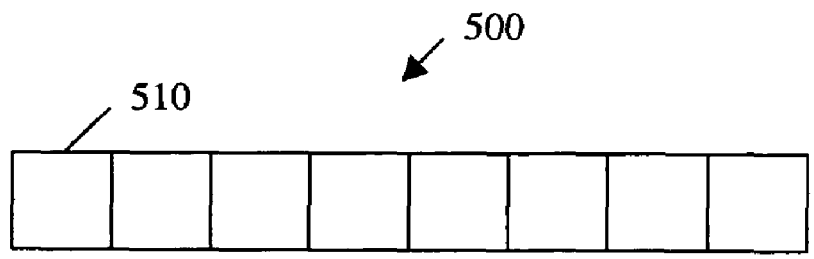
FIG. 5A to 5C shows the formats for the run-length encoding.
Figure 5B:
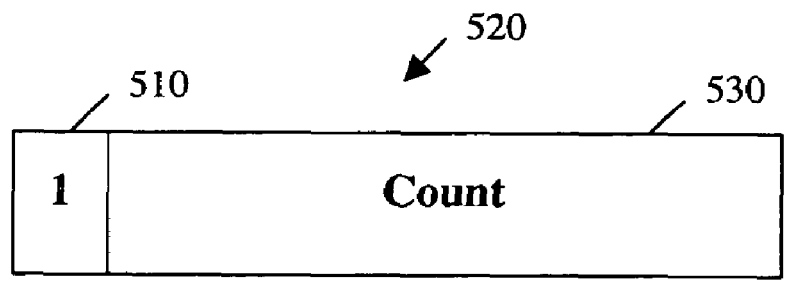
Figure 5C:
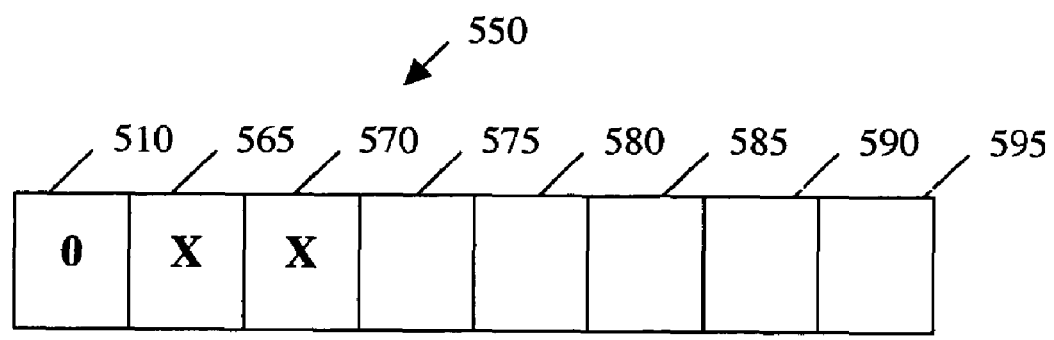

FIGS. 5A to 5C—Run-length Encoding Formats

FIGS. 5A to 5C show the formats for the run-length encoding. FIG. 5A shows a code byte 500, with its high order bit designated as a flag bit 510. Using alternate terminology, FIG. 5A illustrates a data structure 500 having 8 bits of storage. An identification bit 510 is preferably a leading bit within the data structure 500. This identification bit 510 signals whether the particular data structure contains a line number representing the illumination intensity level or a repeat value representing a number of times to repeat an illumination intensity value of a prior pixel. The data structure 500 is used to carry both compressed line number values and the repeat value for compressed strings of similar pixels.

FIG. 5B shows a repeat code 520 comprising a Boolean value one in its flag bit 510 and a 7 bit count 530 in the remaining 7 low order bits. The seven bit count 530 can represent 128 values with a zero representing "128" and 1 through 127 being their own value.

Using alternate terminology for an alternate embodiment, FIG. 5B illustrates a data structure 520 used to transmit the repeat value, which has a specific configuration of the data structure 500 (FIG. 5A). To signal that this data structure 520 is transmitting a repeat value, the identification bit 510 includes a value corresponding to a logical one. The number of times to repeat is preferably stored in the seven remaining bits 530. By storing a logical one in the identification bit 510, the decompressor within the receiver 1106 (FIG. 11) is instructed in an alternate embodiment while decoding to repeat the line number of the previous pixel a number of times corresponding to the seven bit repeat value. In this embodiment, the repeat counter value is limited to a value of 127 which is the maximum number capable of being expressed by seven bits. Alternatively, the repeat counter value can be represented by any appropriate number of bits.

FIG. 5C shows a data code 550 comprising:
1. a Boolean value zero in its flag bit 510
2. two unused data bits: data bit 6 reference by 565 and data bit 5 reference by 570, and
3. five bits, data bits 4 to 0, referenced by 575, 580, 585, 590, and 595, respectively.

The five bits hold a 5 bit code selected from the codes 310 (FIG. 3A) in the encode table 300 (FIG. 3A).

Using alternate terminology, FIG. 5C illustrates a data structure 550 used to transmit a line number, which has a specific configuration of the data structure 500 (FIG. 5A). To signal that this data structure 550 is transmitting a compressed line number, representing an illumination intensity value of a pixel, the identification bit 510 includes a value corresponding to a logical zero. The data structure 550 is configured to transmit the line number that represents the illumination intensity level of the pixel. Preferably, the bits 565 and 570 are unused. The bits 575-595 represent the five-bit line number corresponding to the illumination intensity value from the compression lookup table 310 (FIG. 3A). By setting the identification bit 510 to a logical zero, the decompressor within the receiver 1106 (FIG. 11) recognizes that information held in the five bits 575-595 represents the line number corresponding to the illumination intensity value of a pixel in the data stream.

The preferred embodiment of this invention uses the high order bit of the code byte 500 as the flag bit (or identification bit) 510, because it results in the faster execution of the process. However, any bit could have been designated as the flag bit 510 with the same logical result.

Figure 6:
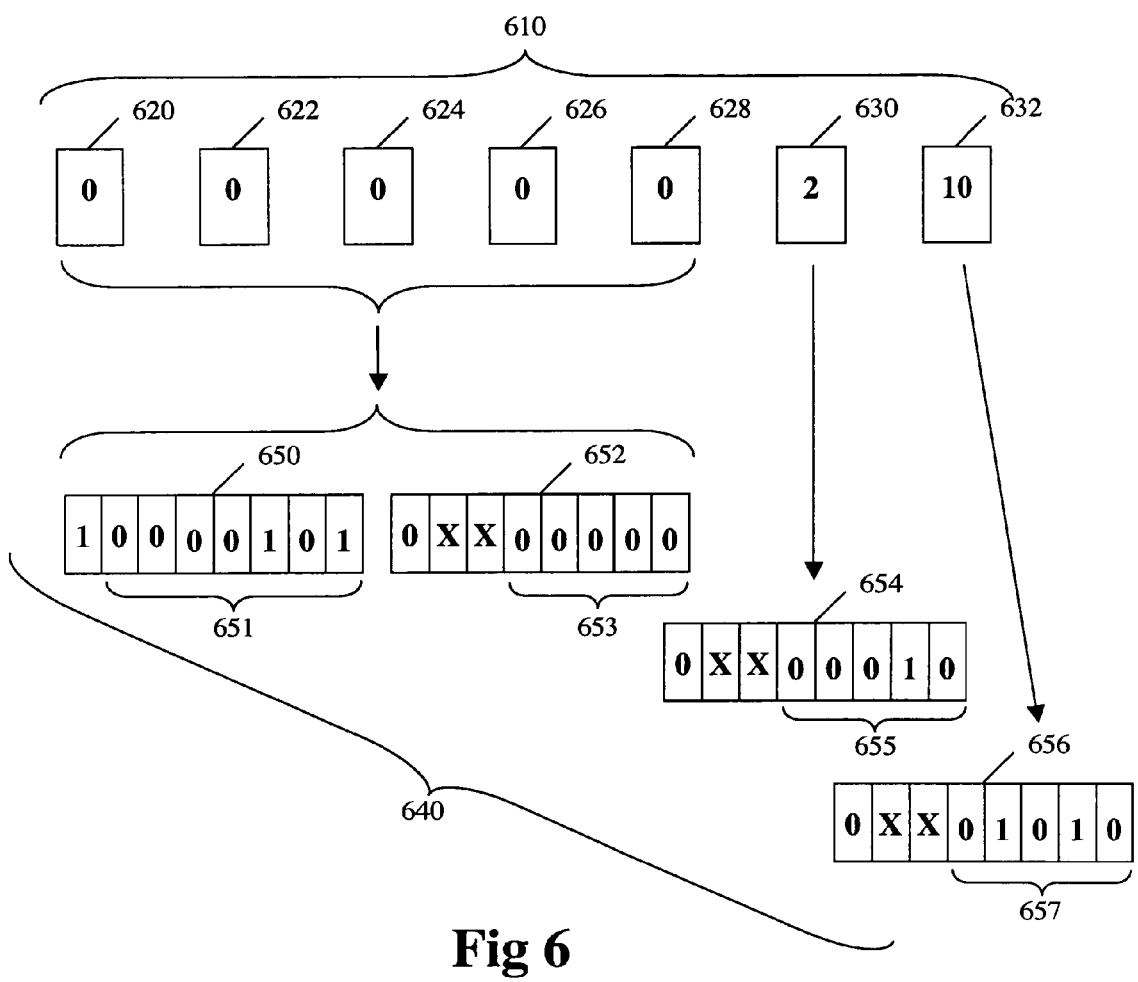
FIG. 6 shows a series of codes and the resulting encoded stream.

FIG. 6—Encoded Data Stream

FIG. 6 shows a series of exemplary decimal values 610 comprising a first value 620 equal to decimal 0, a second value 622 equal to 0, a third value 624 equal to 0, a fourth value 626 equal to 0, a fifth value 628 equal to 0, a sixth value 630 equal to 2, and a seventh value 632 equal to 10. The value zero for 620, 622, 624, 625, and 628 is merely exemplary and could have been any value. After the run-length encoding step 130 (FIG. 1), the corresponding encoded data 140 (FIG. 1) would be compressed down to four bytes of binary code 640 comprising a first byte 650 containing a repeat count 651, a second byte 652 containing a first code 653, a third byte 654 containing a second code 655, and a fourth byte 656 containing a third code 657. The repeat count 651 has a binary value of "0000101" which equals decimal five representing the run-length of the repeating value in the first five of the decimal values 610. The first code 653 has a binary value of "00000" which equals the repeated decimal value zero. The second code 655 has a binary value of "00010" which equals the non-repeated decimal value two. The third code 657 has a binary value of "01010" which equals the non-repeated decimal value ten.

Figure 7:
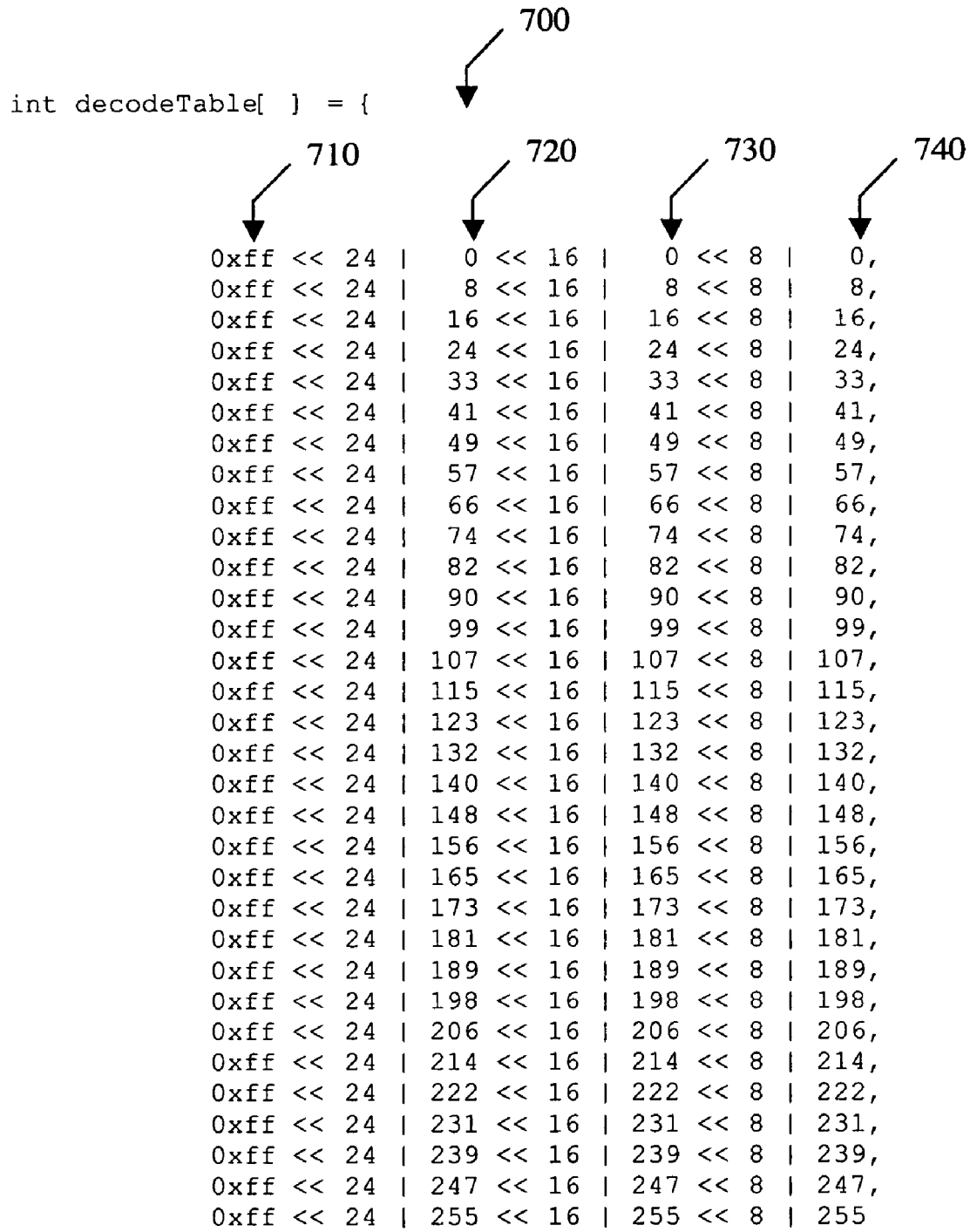
FIG. 7 shows a sample decode table.

FIG. 7—Decode Table

FIG. 7 illustrates a decode table 700 of the preferred embodiment of the present invention. The decode table 700 may be implemented in the C programming language, as shown, or any programming language, and is an array of 32 elements with each element being a 32 bit pixel value 200 (FIG. 2A). The decode table is comprised of a column of alpha values 710, a column of red values 720, and a column of green values 730, and a column of blue values 740, where the alpha values 710 are shifted by 24 bits, the red values 720 are shifted by 16 bits, and the green values 730 are shifted by 8 bits leaving the blue values 740 in place. The line in the decode table 700 contains one element. Each element comprising:

1. the alpha channel 208 (FIG. 2A) with full intensity represented by hexadecimal 0xFF
2. the red channel 206 (FIG. 2A)
3. the green channel 204 (FIG. 2A)
4. the blue channel 202 (FIG. 2A)

where the values of the three color channels are equal to the corresponding stepped values 360 (FIGS. 3A and 3B) associated with each line of the encode table 300 (FIG. 3A).

Although each element is documented as an expression composed of various bit shift and bit-wise OR operations, the expression is evaluated by the compiler when the program is compiled so that each element of the decode table 700 is a 32 bit pixel value 200 (FIG. 3A) ready for direct placement in the decompressed image.

In the preferred embodiment of this invention the 32 bit pixel value 200 (FIG. 2A) is used; however other embodiments use the 24 bit pixel value 210 (FIG. 2B) or other pixel sizes known in the art. Embodiments of other common pixel depths of 16 bit, 15 bit, 8 bit, 4 bit, 3 bit or 1 bit could be used without limiting the scope of this invention. Of course any source resolution less than or equal to five bits would benefit from a modified and shortened encode and decode table or could be encoded by shifting bits as explained below.

Using alternate terminology, FIG. 7 illustrates software code utilized to decompress a compressed stream of data. This software code includes a decompression lookup table 700 which is utilized within the decompressor within the receiver 1106 (FIG. 11). The decompression lookup table 700 is indexed to provide an output average illumination intensity value corresponding to the received line number from the compression lookup table 310. In an alternate embodiment, this decompression lookup table 700 transforms the line number representing the illumination intensity for the stream of pixels which was previously processed by the compressor within the transmitter 1103 (FIG. 11) back into a converted illumination intensity data stream having thirty-two levels of illumination intensity.

Similar to the compression lookup table 310 (FIG. 3A), the decompression lookup table 700 utilizes thirty-two levels wherein each level represents the particular line number. For each received line number, the decompression lookup table 700 provides an output average illumination intensity value for a red scale illumination intensity value 720, a green scale illumination intensity value 730, and a blue scale illumination intensity value 740.

Preferably, these output average illumination intensity values are all equal, thereby providing a gray scale image.

Figure 8:
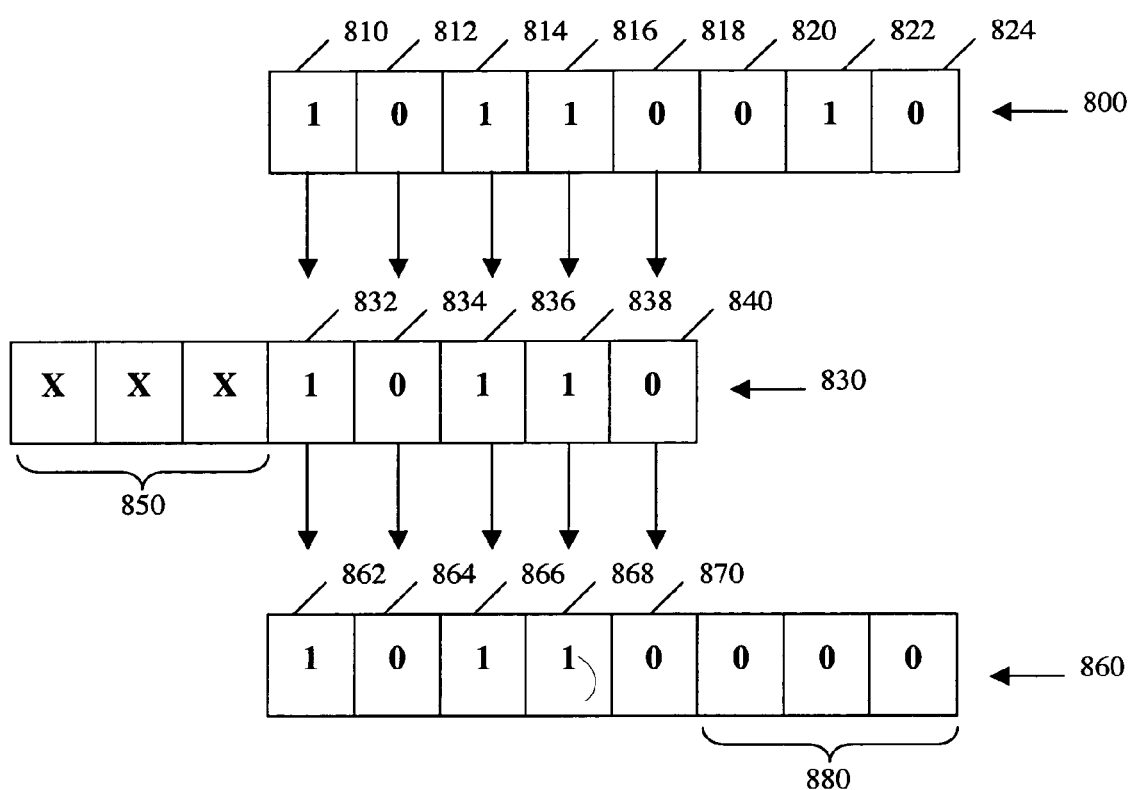
FIG. 8 shows an alternate method of selecting a five bit code.

FIG. 8—Alternate Code Selection

FIG. 8 illustrates an alternate embodiment of this invention where tables are not used for encoding and decoding. Instead, the high order 5 bits 810-818 of an 8 bit pixel 800 are shifted to the right by 3 bit positions to form a five bit sample 830. The upper 3 bits of 830 are ignored bits 850. This shifting to obtain a five bit code replaces steps 405 and 406 of the flowchart in FIG. 4A. The same run-length encoding method is used. During decompression the five bit sample 830 is shifted to the left by 3 bit positions to form a decompressed pixel 860, where the 3 low order bits 880 are filled with zero binary values.

Figure 9:
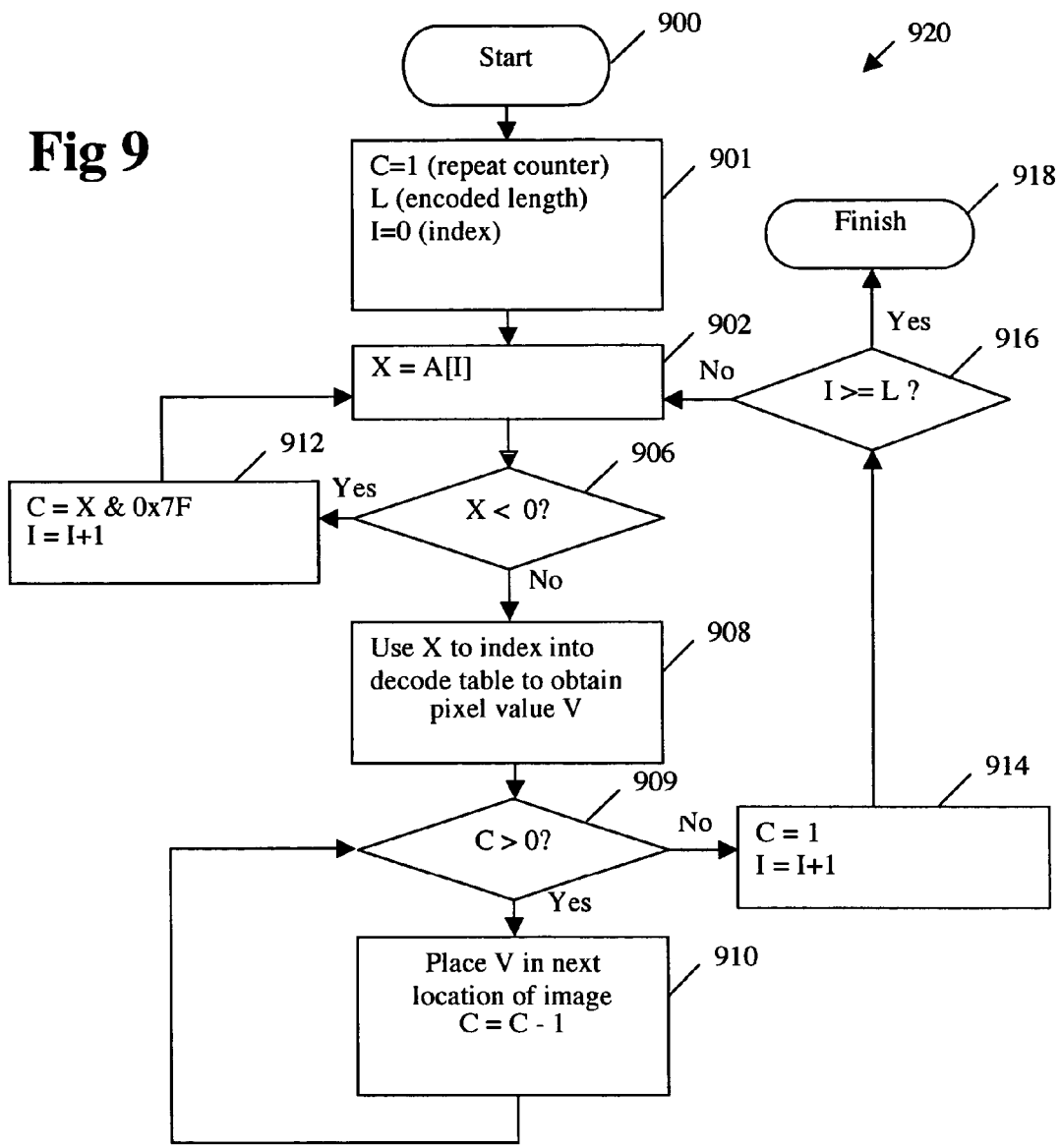
FIG. 9 shows the flow chart for the preferred embodiment of the decompression method.

FIG. 9—Decode Flowchart

FIG. 9 illustrates the decode flowchart 920 which presents the details of the preferred embodiment of the value lookup step 170 (FIG. 1) and the image reconstitution step 180 (FIG. 1).

The decoding begins at a decode entry 900. In a decode initialization step 901, a repeat counter C is set to one, an encoded length L is set to the value obtained with the encoded data 140 (FIG. 1), and an index I is set to 0. Next, a get code step 902 obtains a signed byte X from the encoded data 140 (FIG. 1) array A. A determine type 906 decision checks to see if the signed byte X is less than 0.

If the signed byte X is less than zero, it is because the high order bit, the flag bit 510 (FIG. 5A) is set to binary value 1, as in FIG. 5B, indicating that the byte X is a repeat code 520. Flow goes to assign counter step 912 where the count 530 (FIG. 5B) is extracted from X and placed in the repeat counter C and the next code is accessed by incrementing the index I and returning to the get code step 902.

If the signed byte X is greater than or equal to zero, it is because the flag bit 510 (FIG. 5A) is set to binary 0, as in FIG. 5C, indicating that the byte X is a data code 550. Flow goes to a decode lookup step 908 where the value of byte X is used to index into the decode table 700 (FIG. 7) to obtain a pixel value V. Flow continues to a check zero count 909 decision.

The 909 decision always fails the first time ensuring that a place pixel step 910 is executed. The place pixel step 910 places the pixel value V in the next location of the decompressed image and decrements the repeat counter C and returns to the 909 decision. The pixel value V is placed repeatedly until C decrements to zero. Then the 909 decision branches flow to a reset counter step 914. At step 914 the repeat counter is reset to 1 and the index is incremented to select the next code.

Flow continues to the check length 916 decision where the index I is compared to the encoded length L to determine if there are more codes to be processed. If I is less than L flow returns to step 902, otherwise the decode process terminates at a decode exit 918.

The entire decode process is repeated for each frame image.

Figure 10A:
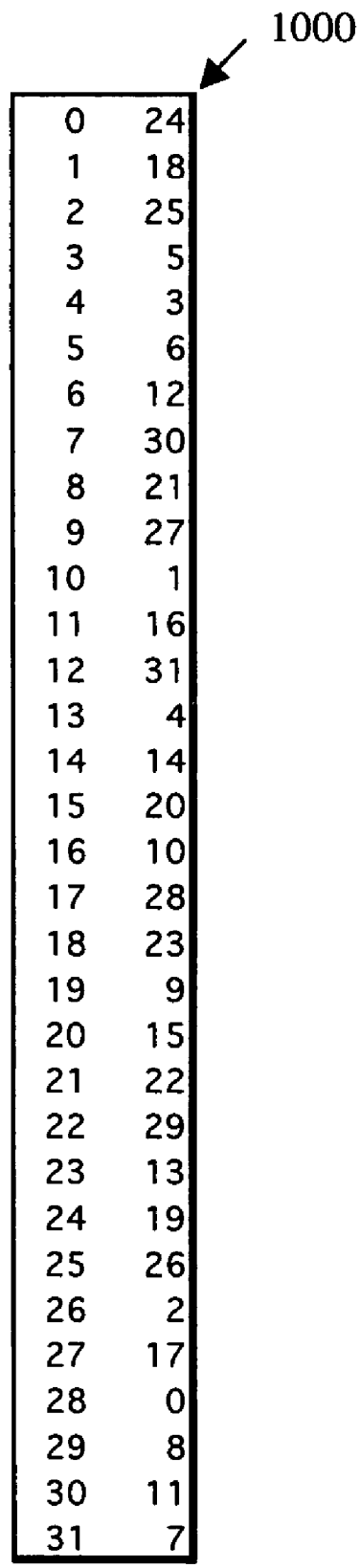

FIGS. 10A to 10C—Encryption Key, Encryption Table, and Decryption Table

FIG. 10A shows an encryption key 1000. The first column shows the original code. The second column shows the corresponding cipher code.

FIG. 10B shows an encryption table 1010, and FIG. 10C shows a decryption table 1020. The encryption table 1010 has the same format as the standard encode table 300 (FIG. 3A), and the decryption table 1020 has the same format as the decode table 700 (FIG. 7). However the entries in both tables are rearranged such that the direct correlation between the intensity level and the position in the table is broken. When these versions of the tables are used, the encode and decode processes and their speed of execution are substantially the same but the encoded data 140 (FIG. 1) becomes a cipher and has a higher level of security. It should be recognized by one with ordinarily skill in the art that there are other embodiments of the present invention with different encryption/decryption table rearrangements.

FIG. 11—Video Transmission System

FIG. 11 illustrates a video system 1100 according to the present invention for transmitting video images from one location to another. The video system 1100 preferably includes a video source 1101, a video cassette recorder 1102, a transmitter 1103, a recorded video device 1104, a computer network 1105, a plurality of receivers 1106, and data links 1110, 1115, 1120, and 1125. Preferably, the video source 1101 includes the video cassette recorder 1102 and is coupled to the transmitter 1103 via the video data link 1110. The transmitter 1103 is also preferably coupled to the recorded video device 1104 and the computer network 1105 via the data links 1115 and 1120, respectively.

Preferably, the plurality of receivers 1106 are coupled to the computer network 1105 via the data links 1125. Each of the plurality of receivers 1106 is preferably a computer system having a display, central processing unit, and input device. The data links 1125 preferably link each of the plurality of receivers 1106 to the computer network 1105. The data links 1125 include any appropriate connection to the computer network 1105 including T1 communication lines, DSL links, cellular links, microwave transmission, land lines, twisted pair cable, and the like. The video system 1100 shown in FIG. 11 is merely illustrative and is only meant to show a preferred embodiment of the present invention.

In alternate embodiments, additional transmitters, video sources, and receivers could be included without departing from the spirit and scope of the video system 1100.

Additionally, in an alternate embodiment, the transmitter 1103 is included within the computer network 1105 and functions as a server within the computer network 1105.

The recorded video device 1104 is preferably coupled to the transmitter 1103 via the data link 1115. Preferably, the recorded video device 1104 stores video images received or compressed by the transmitter 1103 for playback at a later time.

The transmitter 1103 preferably controls the flow of video images from both the video source 1101 and the recorded video component 1104 over the computer network 1105 to any number of the plurality of receivers 1106. Preferably, the transmitter 1103 compresses the video images prior to transmission to one of the plurality of receivers 1106, using an embodiment of the compression method described herein.

In the video system 1100, the computer network 1105 is preferably an Internet Protocol network. In alternate embodiments, the computer network 1105 is any appropriate data network. The computer network 1105 is configured to transmit information between the plurality of receivers 1106 and the transmitter 1103 via the data links 1125 and 1120, respectively.

The plurality of receivers 1106 are preferably configured to selectively receive a stream of video images from the transmitter 1103 via the data link 1120, the computer network 1105, and the appropriate data link 1125. For example, at least one of the plurality of receivers 1106 is programmed to receive the stream of video images from the transmitter 1103. Accordingly, only the selected ones of the plurality of receivers 1106 are capable of receiving the stream of video images from the transmitter 1103. In addition to receiving the stream of video images, the selected ones of the plurality of receivers 1106 are also capable of transmitting instructions to the transmitter 1103 via the data link 1125, the computer network 1105, and the data link 1120.

Preferably, one of the receivers 1106 decompresses the video images upon receipt using an embodiment of the decompression method of described herein.

Figure 12:
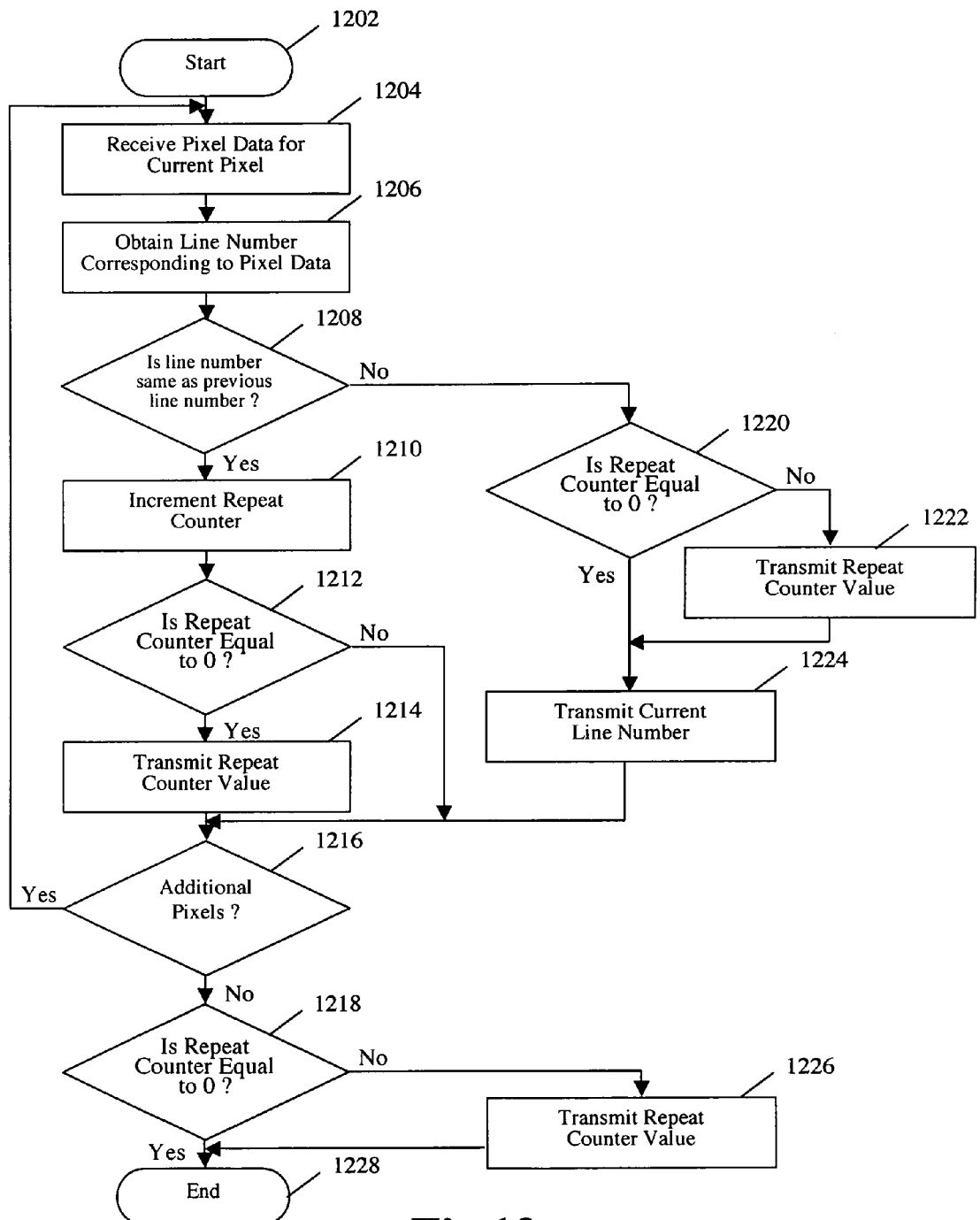
FIG. 12 illustrates a flow chart showing the steps involved in the compression process within a compressor of an alternate embodiment.

FIG. 12—Alternate Compression Flow Chart

FIG. 12 shows a flow chart that illustrates an alternate embodiment of the compression process utilized by the transmitter when compressing a stream of video data. Using alternate terminology, this compression process begins at the start step 1202, clearing the buffer (not shown) and resetting the repeat counter value to zero. At the step 1204, an illumination intensity value representing a current pixel is received. Next, at the step 1206, a current line number from the lookup table 310 (FIG. 3A) is obtained for the pixel data corresponding to the current illumination intensity value for the pixel. At the step 1208, it is determined whether the current line number for the pixel data is the same as the previous line number. The previous line number is preferably stored in the buffer. If the previous line number is not stored in the buffer, then the current line number and the previous line number cannot be the same. If the line number is the same as the previous line number, the repeat counter value is incremented by one, at the step 1210. It is then determined whether the repeat counter value is equal to a value of 127, at the step 1212. If the repeat counter value is equal to a value of 127, then, at the step 1214, the repeat counter value is transmitted out of the transmitter within a data structure that is similar to the data structure 520 (FIG. 5B). Additionally in the step 1214, the repeat counter value is reset to a value of zero after being transmitted in the data structure. If the repeat counter is not equal to the value of 127, the process then proceeds directly to the step 1216.

Returning back to the step 1208, if the current line number is not the same as the previous line number, then it is determined whether the repeat counter value is equal to a value of zero, in the step 1220. If it is determined at the step 1220, that the repeat counter value is not equal to the value of zero, then at the step 1222, the repeat counter value is transmitted out of the compressor and into the buffer within a data structure that is similar to the data structure 520 (FIG. 5B). Additionally, at the step 1222, the repeat counter value is reset to a value of zero after being transmitted in the data structure. If it is determined at the step 1220, that the repeat counter value is equal to the value of zero, or after the step 1222 is completed, then the line number representing the current illumination intensity value is transmitted out of the compressor and into the buffer, at the step 1224, within a data structure that is similar to the data structure 550 (FIG. 5C). Additionally, after the current line number is transmitted, the current line number is stored in the buffer as the previous line number, at the step 1224. After the step 1224 is completed, the process proceeds to the step 1216.

At the step 1216, it is determined whether there is any additional pixel data corresponding to additional pixels. If there is additional pixel data, then the compression process loops back to the step 1204 to receive and process the data representing the next pixel. If there is no additional pixel data, then the process proceeds to the step 1218. At the step 1218, it is determined whether the repeat counter value is equal to a value of zero.

If the repeat counter value is equal to the value of zero, then the process proceeds to the ending step 1228. If the repeat counter value is not equal to the value of zero, then, at the step 1226, the repeat counter value is transmitted out of the compressor and into the buffer within a data structure that is similar to the data structure 520 (FIG. 5B). Additionally in the step 1226, the repeat counter value is reset to a value of zero after being transmitted in the data structure. After the step 1226, then the process proceeds to the ending step 1228.

Figure 13:
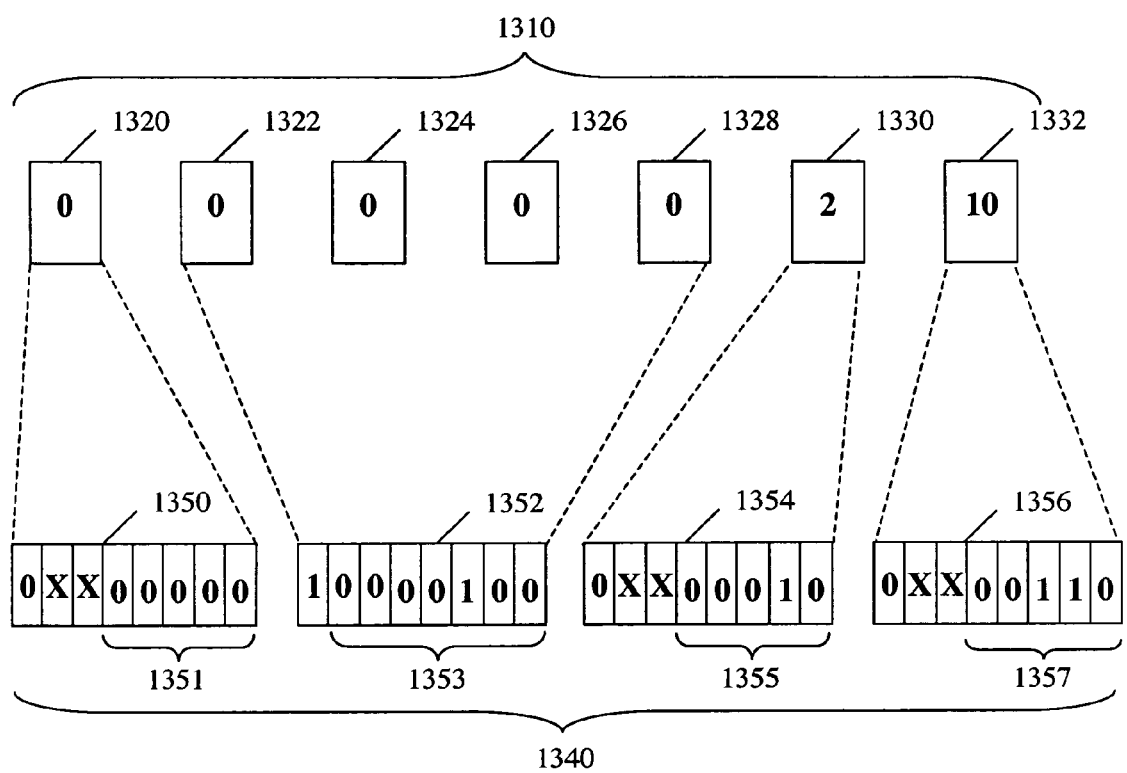
FIG. 13 illustrates a sample data stream representing video pixels and a corresponding compressed data stream.

FIG. 13—Alternate Encoded Data Stream

FIG. 13 illustrates a sample uncompressed illumination intensity data stream 1310 including data blocks 1320, 1322, 1324, 1326, 1328, 1330, and 1332. This example uses the same data as shown in FIG. 6. A comparison with FIG. 6 will highlight the differences between the flow chart in FIG. 4A and FIG. 12.

Using alternate terminology, each block includes pixel data representing an illumination intensity value of a corresponding pixel in this uncompressed data stream 1310 (same as 610). Preferably, this illumination intensity level is the blue scale value for the particular represented pixel. For example, after the step 1206 (FIG. 12) of obtaining a line number value for each of the data blocks, the blocks 1320-1328 have a line number value of zero; the block 1330 has a line number value of two; and the block 1332 has a line number value of ten. A compressed illumination intensity data stream 1340 includes data structures 1350, 1352, 1354, and 1356. The compressed data stream 1340 represents the uncompressed data stream 1310 with four data structures. Similar to the illumination intensity data structure 550 (FIG. 5C), the data structures 1350, 1354, and 1356 represent the illumination intensity value of the pixels associated with the data blocks 1320, 1330, and 1332, respectively. A segment 1351 of the data structure 1350 contains a five-bit line number having a value of zero. Similarly, the segments 1355 and 1357 contain five-bit line numbers having values of two and ten, respectively. Similar to the repeat data structure 520 (FIG. 5B), the data structure 1352 represents the illumination intensities of the pixels associated with the data blocks 1322,1324,1326, and 1328. A segment 1353 stores the seven bit repeat counter value of four which is the number of times the line number of the prior pixel 1320 is repeated.

Figure 14:
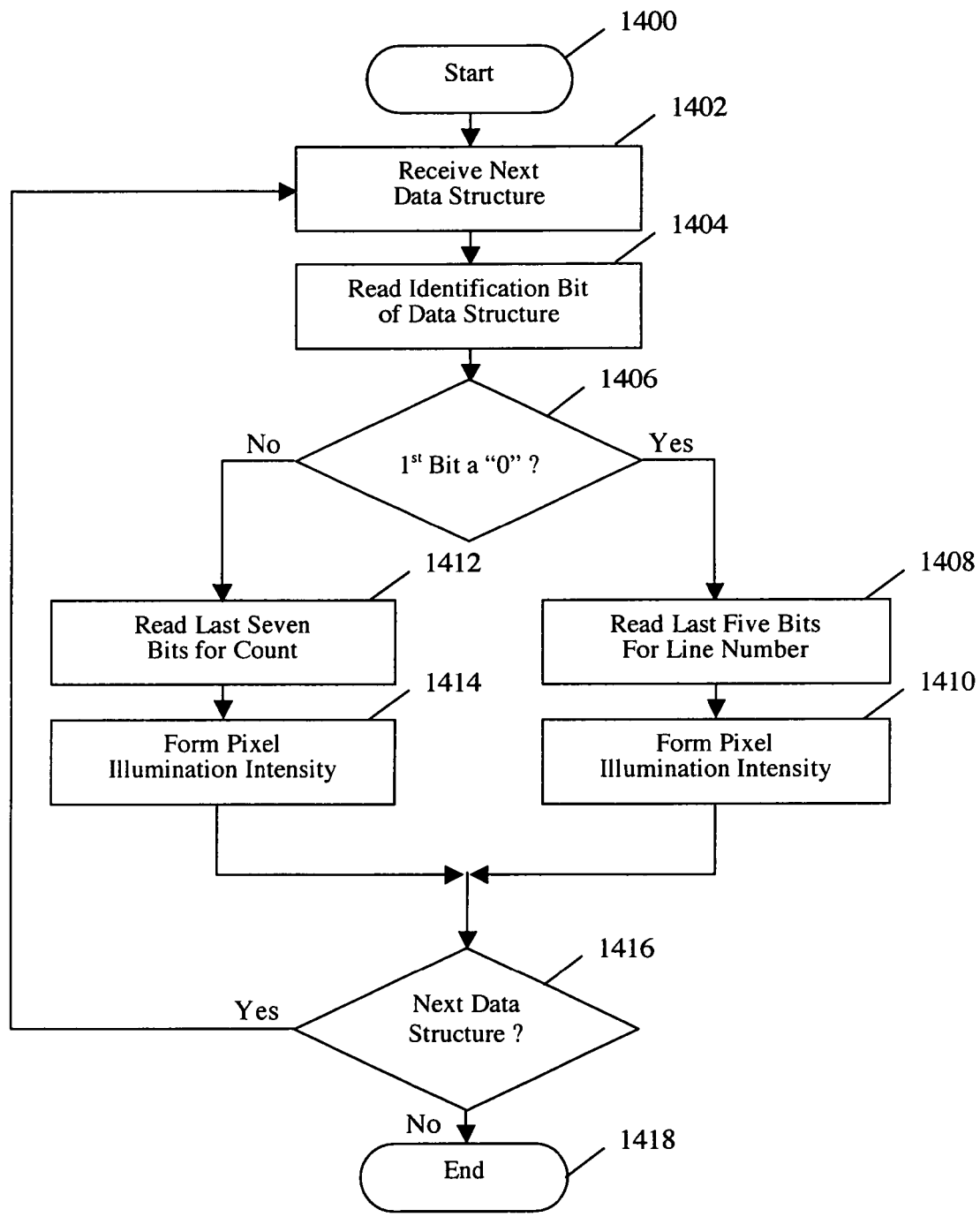
FIG. 14 illustrates a flow chart showing the steps involved during the decompression process of an alternate embodiment.

FIG. 14—Alternate Decompression Flow Chart

FIG. 14 illustrates a flow chart which shows an alternate decompression process utilized by the decompressor within the receiver 1106 to decompress a compressed stream of data.

Using alternate terminology, this decompression process begins at a start step 1400 and proceeds to the step 1402. At the step 1402, a stream of compressed data that was compressed by the compressor and includes data representing the illumination intensity of a plurality of pixels waits to be received. The stream of compressed data contains a plurality of data structures which resemble the data structure 500 (FIG. 5A). At the step 1402, the next data structure in the stream of compressed data is received as a present data structure. Next, at the step 1404, the identification bit within the present data structure received by the step 1402 is detected. At the step 1406, it is determined if the identification bit which was detected at the step 1404 has a value of logical zero or logical one. If the identification bit has a value of logical one, then the present data structure contains a repeat counter value and is decoded at the step 1412. If the identification bit has a value of logical zero, then the present data structure contains a line number and is decoded at the step 1408.

At the step 1412, the repeat counter value is read from the present data structure.

Recall that the repeat counter value stores the number of times to repeat the line number associated with the illumination intensity values of the prior pixel. Next, at the step 1414, a particular number of pixels corresponding to a number stored as the repeat counter value, is generated with the illumination intensity values of the prior pixel. The illumination intensity value of the prior pixel is stored in the buffer within the decompressor. For example, if the repeat counter value is five, then five pixels are generated with the illumination intensity values of the prior pixel at the step 1414.

At the step 1408, the line number is read from the present data structure. The line number corresponds to a row within the decompression lookup table 700 (FIG. 7) which includes the illumination intensity values for the pixel. Next, at the step 1410, a pixel is generated having illumination intensity values which correspond to the line number read from the step 1408.

Additionally, the illumination intensity values are also stored in the buffer within the decompressor. For example, if the line number within the present data structure has a value of two, then according to the decompression lookup table 700 (FIG. 7), the illumination intensity values for the red, green, and blue values of the pixel are sixteen.

After the illumination intensity values are determined at the step 1410 or the step 1414, it is determined, at the step 1416, if there are additional data structures within the compressed stream of data currently being received. If there are additional data structures, then this process loops back to the step 1402 where the next data structure is received, and the process begins again. If there are no additional data structures, then this process ends at the step 1418.

Figure 15:
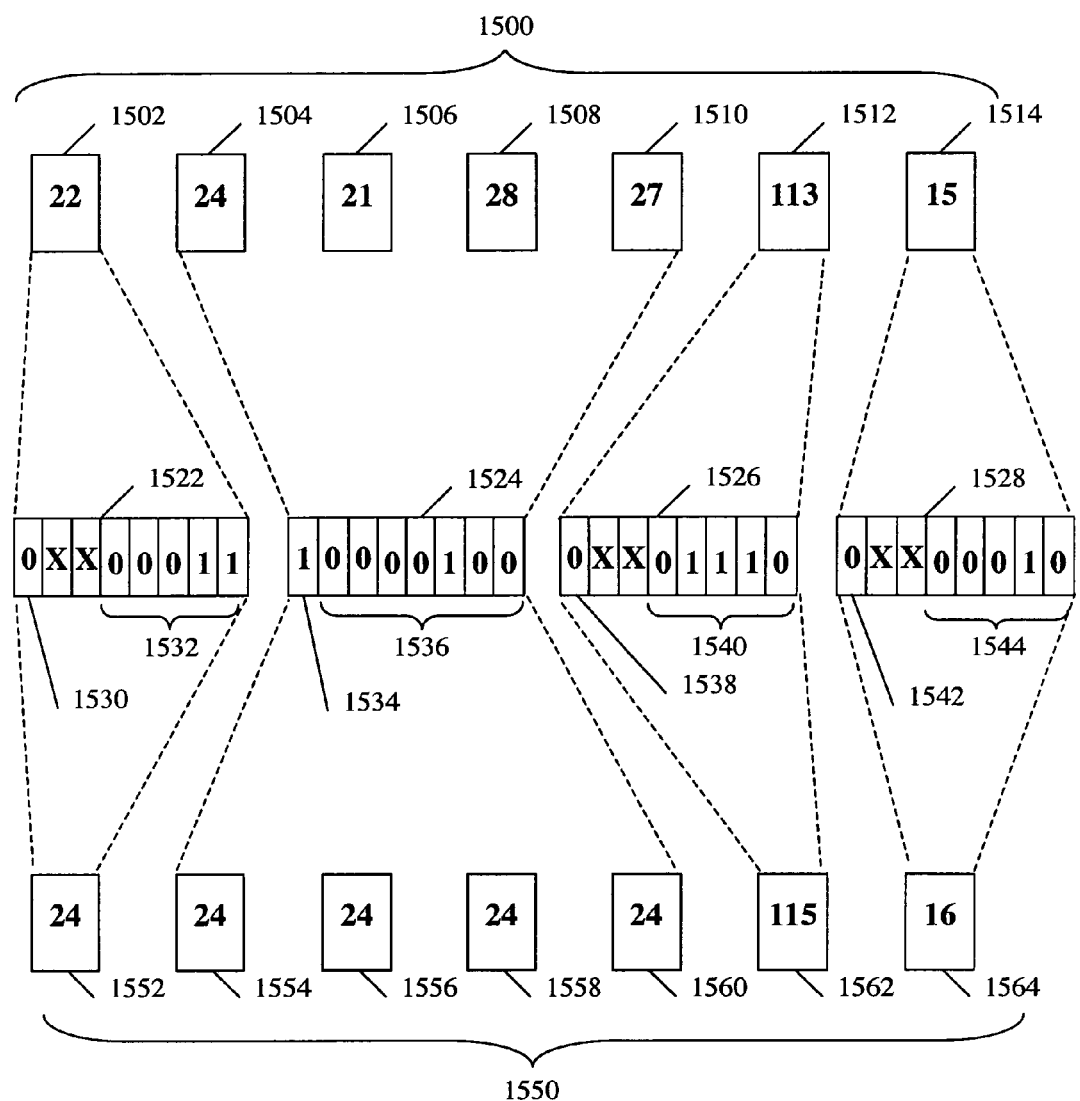
FIG. 15 illustrates an uncompressed data stream, a corresponding compressed data stream, and a corresponding converted data stream of an alternate embodiment.

FIG. 15—Example of Compression and Decompression Using the Alternate Methods In FIG. 15, sample data streams illustrating the compression and the decompression process of the alternate embodiment are shown. The sample data streams include an uncompressed data stream 1500, a compressed data stream 1520, and a decompressed data stream 1550. The uncompressed data stream 1500 includes seven pixel data blocks 1502 through 1514 wherein each of these pixel data blocks represents the illumination intensity value of the particular pixel. The compressed data stream 1520 includes four data blocks 1522-1528 which are generated by the compressor and represent the uncompressed data stream 1500. The decompressed data stream 1550 is generated from the decompressor and includes seven pixel data blocks 1552-1564 each representing the average illumination intensity value of the particular pixel.

Advantages

Filtering and Image Enhancement

The stepped values 360 (FIG. 3A) are a significant discovery of the present invention. The use of these specific values results in high quality decompressed images when the original image is generated by an electronic sensing device such as an ultrasound machine. The encode table 300 is arranged such that the spikes in the video signal are filtered in the high and low end, line numbers 31 and 0, respectively. The remaining values are distributed more evenly with larger ranges at line 3, 7, 15, 19, 23, and 27.

By altering the contents of the encode table 300 and the decode table 700 various filters can be implemented to enhance the image quality. A high or low noise filter can be beneficial when the image is generated by an imaging technology such as radar, ultrasound, x-ray, magnetic resonance, or similar technology. Variations in the encode and decode table can be made to enhance the perceived quality of the decompressed image. Therefore, altering the contents, shape, or size of the encode table 300 and the decode table 700 is anticipated by this invention and specific values in the tables should not be construed as limiting the scope of this invention.

Execution Speed

The preferred embodiment of this invention use a number of techniques to reduce the time required to compress and decompress the data.

The methods require only a single sequential pass through the data. Both the compression steps 100 and the decompression steps 150 access a pixel once and perform all calculations.

When selecting the 8 bit pixel value 299, the preferred embodiment selects the low order bits from the 32 bit pixel value 200 or the 24 bit pixel value 210 so that an additional shift operation is avoided.

The encode table 300 is a fast and efficient way to convert the 8 bit pixel value 299 into one of the 5 bit codes 310.

The decode table 700 contains 32 entries each comprised of the 32 bit pixel value 200 that are ready for placement in the decompressed image. Although each element is documented as an expression composed of various bit shift and bit-wise OR operations, the expression may also be evaluated by a compiler when the program is compiled so that each element of the decode table 700 becomes a 32 bit pixel value 200.

General Purpose

Although the preferred embodiment of the present invention is tuned to the characteristics of a medical image, its lossless compression of the sampled data results in high quality video streams that have general purpose application in a number of areas including, without limitation, video conferencing, surveillance, manufacturing, and rich media advertising.

Lossless Nature/No Artifacts

Once the analog signal is sub-sampled and filtered to select a five bit code value which eliminates some of the real world defects, the methods of the present invention compress and decompress the data with no irreversible data loss. Unlike JPEG and MPEG, the decompressed image never suffers from artificially induced blocking or smearing or other artifacts that are result of the lossy compression algorithm itself. As a result even a small sub-sample of the image remains clear and true to the perceived quality of the original image.

Conclusion, Ramification, and Scope

Accordingly, the reader will see that the compression and decompression steps of the present invention provides a means of digitally compressing a video signal in real time, communicating the encoded data stream over a transmission channel, and decoding each frame and displaying the decompressed video frames in real time.

Furthermore, the present invention has additional advantages in that:

1. it provides a means of filtering real world defects from the video image and enhancing the image quality;
2. it allows for execution of both the compression and decompression steps using software running on commonly available computers without special compression or decompression hardware;
3. it provides decompressed images that have high spatial quality that are not distorted by artifacts of the compression algorithms being used;
4. is provides a scalable means of video compression; and
5. it provides a means for reducing the space required in a storage medium.

Although the descriptions above contain many specifics, these should not be construed as limiting the scope of the invention but as merely providing illustrations of some of the preferred embodiments of this invention. For example, stepped values in the encode and decode tables can be altered and the same relative operation, relative performance, and relative perceived image quality will result. Also, these processes can each be implemented as a hardware apparatus that will improve the performance significantly.

Thus the scope of the invention should be determined by the appended claims and their legal equivalents, and not solely by the examples given.

We claim:

1. A method of compressing a stream of data representing a stream of pixels, each pixel having a corresponding illumination intensity value, the method implemented by one or more computing devices, the method comprising:
   a. matching by a computing device, the illumination intensity value representing a pixel with a current line number;
   b. determining by a computing device, if the current line number matches a previous line number of an immediately prior pixel;
   c. incrementing by a computing device, a repeat counter if the current line number matches the previous line number;
   d. encoding by a computing device, a repeat data structure with the repeat counter, if the current line number does not match the previous line number and the repeat counter has a value greater than zero; and
   e. encoding by a computing device, a line number data structure with the current line number if the current line number does not match the previous line number;
   wherein a compressed stream of data is formed from combinations of the line number data structure and the repeat data structure.

2. The method according to claim 1 further comprising repeating by a computing device, the repeat counter to zero after the repeat data structure is encoded.

3. The method according to claim 1 wherein the repeat data structure and the line number data structure include an identification bit,
   wherein when the identification bit is in a first state, a repeat data structure is encoded and when the identification bit is in a second state, a line number data structure is encoded.

4. The method according to claim 3 further comprising:
   a. receiving by a computing device, the compressed stream of data, one data structure at a time;
   b. reading by a computing device, the identification bit within the data structure to determine if the data structure is a line number data structure or a repeat data structure;
   c. generating by a computing device, a representative average illumination intensity value corresponding to the line number if the data structure is a line number data structure; and
   d. generating by a computing device, a number of representative average illumination intensity values corresponding to the line number of a last received line number data structure if the data structure is a repeat data structure, wherein the number is equal to the repeat counter within the repeat data structure.

5. A method of compression of graphic images which make up a video stream, the method implemented by one or more computing devices, the method comprising:
   (a) selecting by a computing device, an image from said graphic images;
   (b) processing by a computing device, each pixel in a set of pixels from said image, wherein the processing includes:
      (i) selecting a first number of bits from each said pixel, each pixel having a corresponding illumination intensity value, wherein each pixel comprises a second number of bits and wherein said first number of bits is less than said second number of bits, said first number of bits comprising the illumination intensity value;
      (ii) selecting a line number having a third number of bits, by matching the illumination intensity value with a current line number;
      (iii) determining if the current line number matches a previous line number of an immediately prior pixel;
      (iv) if the current line number is the same as a said previous line number, incrementing a repeat counter which counts the number of sequential matching line numbers;
      (v) if the current line number is not the same as said previous line number, placing said previous line number arid a current value of said repeat counter in an array of encoded data, wherein said previous line number is formatted as a line number data structure and said current repeat counter value is formatted as a repeat data structure, said data structures comprising an encoded code, and resetting the value of the repeat counter;
   (c) upon processing the last pixel in said set of pixels from said image, placing by a computing device, the last previous line number and the last current value of said repeat counter in said array of encoded data, whereby said array of encoded data represents said image;
   (d) outputting by a computing device, said array of encoded data;
   (e) selecting by a computing device, a subsequent image from said graphic images; and
   (f) repeating the processing through selection operations for a series of subsequent images;
   wherein a compressed stream of video data is formed from combinations of the line number data structure and the repeat data structure.

6. The method of claim 5 wherein said image and said subsequent image are from a set of images that are separated temporally by a predetermined period of time.

7. The method of claim 6 wherein said predetermined period of time is less than or equal to $1/15$th of a second.

8. The method of claim 5 wherein said set of pixels is a subset of all the pixels in said image.

9. The method of claim 8 wherein said subset of all the pixels in said image is selected by selecting every other pixel in every other row of pixels.

10. The method of claim 5 wherein said line number indicates the number of a line in a reduced Level index lookup table, said lookup table having multiple values in each line, wherein at least one of the lines in the lookup table has a different number of values than at least one other of the lines.

11. The method of claim 5 wherein said first number of bits is eight, said second number of bits is greater than eight, and a third number of bits is five.

12. The method of claim 5 wherein said line number is obtained from an encryption table.

13. The method of claim 12 wherein said line number is an encrypted value which is not equal to any of the group of:
   (a) the value of the first number of bits selected from of said pixel,
   (b) the value of the second number of bits of said pixel,
   (c) the value of any other number of bits selected from said pixel,
   whereby the original value of said pixel is not readily discernable from said code value.

14. The method of claim 5 further comprising: steps of:
   (g) inputting by a computing device, said array of encoded data;
   (h) processing by a computing device, each said encoded code in said array, wherein the processing includes:
      i. extracting said line number from said line number data structure as a decode value, ii. extracting said repeat counter value from said repeat data structure as a decode count,
iii. determining a decoded pixel value based on the decode value,
iv. placing the decoded pixel value in a decoded image a number of times indicated by the decode count;
(i) displaying said decoded image;
(j) inputting a subsequent array of encoded data representing said subsequent images; and repeating the processing of the encoded code through the inputting operation for at least a subset of said subsequent images;

wherein a decompressed stream of video data is decompressed from combinations of the line number data structure and the repeat data structure.

15. The method of claim 14 wherein said decode pixel value comprises the decode value.

16. The method of claim 14 wherein said decode pixel value is obtained from a decode table.

17. The method of claim 8, the subset of all the pixels having dimensions less than or equal to 320 by 240.

18. The method of claim 12, wherein the lines of said line number table are randomly ordered forming an encryption table so that the correlation between the original illumination intensity values and their representative line numbers are encrypted.

19. The method of claim 16 wherein the lines of the decode table are ordered in a sequence matching a corresponding encryption table so that the correct final pixel values are displayed.

20. A machine for compressing a plurality of video frames which make up a video signal, comprising:
   (a) video digitizer configured to digitize a frame from said video frames, generating a plurality of pixels for the frame:
   (b) a video memory coupled to the video digitizer and configured to receive the plurality of pixels from said video digitizer;
   (c) an encoding circuit coupled to the video memory and configured to compress, according to the method of claim 5, said plurality of pixels;
   (d) a memory coupled to the encoding circuit and configured to store said encoded data; and
   (e) an input/output device couple to at least one of the video digitizer, the video memory , the encoding circuit, or the memory.

21. A machine for compressing a plurality of video frames which make up a video signal, comprising:
   (a) video digitizer configured to digitize a frame from said video frames, to generate a plurality of pixels for the frame;
   (b) a video memory coupled to the video digitizer and configured to receive the plurality of pixels from said video digitizer;
   (c) an encoding circuit coupled to the video memory and configured to compress, according to the method of claim 13, said plurality of pixels;
   (d) a memory coupled to the encoding circuit and configured to store said encoded data; and
   (e) an input/output device couple to at least one of the video digitizer, the video memory, the encoding circuit, or the memory.

22. The machine of claim 20 wherein said input/output device is a storage medium.

23. The machine of claim 20 wherein said input/output device is a communications transmission channel.

24. A machine for decompressing a stream of encoded data that represents a video signal, comprising:
   (a) an input/output device for reading said stream of encoded data;
   (b) a decoding circuit coupled to the input/output device and configured to decompress said stream of encoded data according to the method of claim 14, and generate one or more images, each comprising a plurality of pixel values; and
   (c) a memory coupled to the decoding unit and configured to store said one or more images to be displayed as frames of a video sequence.

25. A machine for decompressing a stream of encoded data that represents a video signal, comprising:
   (a) an input/output device for reading said stream of encoded data;
   (b) a decoding circuit coupled to the input/output device and configured to decompress said stream of encoded data according to the method of claim 16, and generate one or more images, each comprising a plurality of pixel values; and
   (c) a memory coupled to the decoding unit and configured to store said one or more images to be displayed as frames of a video sequence.

* * * * *

UNITED STATES PATENT AND TRADEMARK OFFICE
CERTIFICATE OF CORRECTION

PATENT NO. : 7,526,029 B2
APPLICATION NO. : 11/280656
DATED : April 28, 2009
INVENTOR(S) : Kendyl A. Roman et al.

It is certified that error appears in the above-identified patent and that said Letters Patent is hereby corrected as shown below:

Title Page item 57

In the Abstract, "Real time decompression is achieve by decoding and decompressing" should read --Real time decompression is achieved by decoding and decompressing--

At col. 22, line 9, "placing said previous line number arid a current value of said repeat counter" should read --placing said previous line number and a current value of said repeat counter--

At col. 22, line 41, "the number of a line in a reduced Level index lookup" should read --the number of a line in a reduced level index lookup--

Signed and Sealed this

Tenth Day of November, 2009

David J. Kappos
*Director of the United States Patent and Trademark Office*